US012482431B2

(12) United States Patent
Kang et al.

(10) Patent No.: US 12,482,431 B2
(45) Date of Patent: Nov. 25, 2025

(54) DISPLAY APPARATUS

(71) Applicant: Samsung Display Co., LTD., Yongin-si (KR)

(72) Inventors: Byeong Soo Kang, Yongin-si (KR); Man Sung Kim, Yongin-si (KR); Tae Ho Kim, Yongin-si (KR); Yong Ho Sung, Yongin-si (KR); Seung Jun Lee, Yongin-si (KR); Yong Su Lee, Yongin-si (KR); Jae Woo Lee, Yongin-si (KR); Sang Min Jeon, Yongin-si (KR); Seung Hwan Cho, Yongin-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/650,956

(22) Filed: Apr. 30, 2024

(65) Prior Publication Data

US 2025/0046257 A1 Feb. 6, 2025

(30) Foreign Application Priority Data

Aug. 4, 2023 (KR) ........................ 10-2023-0101981

(51) Int. Cl.
*G09G 3/3275* (2016.01)

(52) U.S. Cl.
CPC ... *G09G 3/3275* (2013.01); *G09G 2310/0297* (2013.01); *G09G 2310/08* (2013.01)

(58) Field of Classification Search
CPC ............... G09G 3/3275; G09G 3/3233; G09G 2310/0297; G09G 2310/08; H10K 59/131
See application file for complete search history.

(56) References Cited

U.S. PATENT DOCUMENTS

2005/0151714 A1* 7/2005 Hirama ................ G09G 3/3688 345/100
2006/0139255 A1* 6/2006 Kim ..................... G09G 3/3233 345/76

(Continued)

FOREIGN PATENT DOCUMENTS

KR 10-1977592 5/2019
KR 10-2021-0046910 4/2021
KR 10-2023-0016764 2/2023

*Primary Examiner* — David Tung
(74) *Attorney, Agent, or Firm* — Harness, Dickey & Pierce, P.L.C.

(57) ABSTRACT

A display device includes a circuit layer including emission pixel drivers, and data lines transferring data signals of the emission pixel drivers; a data driver generating the data signals of the emission pixel drivers; and a demultiplexer circuit electrically connected between the data driver and the data lines and including a first demultiplexer transistor turned on by a first demultiplexer control signal and a second demultiplexer transistor turned on by a second demultiplexer control signal. A first data line of the data lines is electrically connected to the data driver through the first demultiplexer transistor and a transfer path shorter than a first extension length. A second data line of the data lines is electrically connected to the data driver through the second demultiplexer transistor and a transfer path longer than or equal to the first extension length.

13 Claims, 19 Drawing Sheets

(56) References Cited

U.S. PATENT DOCUMENTS

| | | | | |
|---|---|---|---|---|
| 2010/0156776 | A1* | 6/2010 | Jeoung | G09G 3/3688 345/98 |
| 2015/0199936 | A1* | 7/2015 | Watanabe | G09G 3/3685 345/100 |
| 2015/0255030 | A1* | 9/2015 | Watsuda | G09G 3/3685 345/92 |
| 2016/0093260 | A1 | 3/2016 | Watsuda | |
| 2019/0140036 | A1* | 5/2019 | Hyeon | H10K 77/111 |
| 2019/0147798 | A1* | 5/2019 | Hwang | G09G 3/3233 345/691 |
| 2020/0394967 | A1* | 12/2020 | Park | G06F 1/1637 |
| 2022/0246077 | A1 | 8/2022 | Yang et al. | |
| 2023/0050569 | A1* | 2/2023 | Dong | G09G 3/3233 |

* cited by examiner

DISPLAY APPARATUS

CROSS-REFERENCE TO RELATED APPLICATION(S)

This application claims priority to and benefits of Korean Patent Application No. 10-2023-0101981 under 35 U.S.C. § 119 filed on Aug. 4, 2023, in the Korean Intellectual Property Office, the entire contents of which are incorporated herein by reference.

BACKGROUND

1. Technical Field

The disclosure relates to a display device.

2. Description of the Related Art

As the information society develops, the demand for display devices for displaying images has increased and diversified. For example, display devices have been applied to various electronic devices such as smartphones, digital cameras, laptop computers, navigation devices, and smart televisions.

The display devices may be flat panel display devices such as liquid crystal display devices, field emission display devices, or light emitting display devices. Here, the light emitting display device may include an organic light emitting display device including organic light emitting elements, an inorganic light emitting display device including inorganic light emitting elements such as inorganic semiconductors, and a micro light emitting display device including micro light emitting elements.

The organic light emitting display device displays an image using light emitting elements each including a light emitting layer made of an organic light emitting material. As such, the organic light emitting display device implements image display using self-emitting elements, and accordingly, may have relatively excellent performance in terms of power consumption, response speed, luminous efficiency, luminance, and wide viewing angle, and the like, compared to other display devices.

One surface of the display device may be a display surface including a display area in which an image is displayed and a non-display disposed around the display area. Emission areas emitting light of each luminance and color may be arranged in the display area.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

As resolution of the display device or a size of the display device increases, the number of data lines increases, and accordingly, the dispersion of transfer paths between the data lines and data drivers may increase. For this reason, a distorted or delayed data signal may be supplied to a data line having a relatively long transfer path among the data lines.

As the resolution of the display device or the size of the display device increases, the number of data lines increases, and accordingly, the number of channels of the data driver or the number of data drivers may increase. For this reason, it may be disadvantageous in slimming the display device and reducing a manufacturing cost of the display device.

Aspects of the disclosure provide a display device capable of reducing distortion of data signals without changing data drivers, which may be advantageous in increasing resolution or a size of the display device.

According to an aspect of the disclosure, there is provided a display device that may include a main area including a display area in which emission areas are disposed and a non-display area disposed around the display area and a sub-area protruding from a side of the main area; a circuit layer disposed on a substrate, the circuit layer including emission pixel drivers electrically connected to light emitting elements of the emission areas, respectively, and data lines transferring data signals of the emission pixel drivers; a data driver generating the data signals of the emission pixel drivers; and a demultiplexer circuit electrically connected between the data driver and the data lines, the demultiplexer circuit including a first demultiplexer transistor turned on by a first demultiplexer control signal and a second demultiplexer transistor turned on by a second demultiplexer control signal. A first data line of the data lines may be electrically connected to the data driver through the first demultiplexer transistor and the first data line may include a transfer path shorter than a first extension length. A second data line of the data lines may be electrically connected to the data driver through the second demultiplexer transistor and the second data line may include a transfer path longer than or equal to the first extension length.

The first demultiplexer control signal may be supplied during a first period of each image frame period. The second demultiplexer control signal may be supplied during a second period after the first period of each image frame period.

A data signal of the second data line may include a compensation value corresponding to the first extension length.

A voltage level of a highest grayscale of the data signal of the second data line may be higher than a voltage level of a highest grayscale of a data signal of the first data line based on the compensation value.

The second period may be longer than the first period based on the compensation value.

The data driver and the demultiplexer circuit may be disposed in the sub-area of the substrate. The first data line may be more adjacent to the sub-area than the second data line. The circuit layer may further include data supply lines extending from the sub-area to the display area and electrically connected between the data lines and the demultiplexer circuit. The transfer path of the first data line may include a first data supply line electrically connected between the first demultiplexer transistor and the first data line among the data supply lines. The transfer path of the second data line may include a second data supply line electrically connected between the second demultiplexer transistor and the second data line among the data supply lines.

The first data line may be directly electrically connected to the first data supply line. The transfer path of the second data line may further include a first bypass auxiliary line disposed in the display area, extending in a first direction, and electrically connected to the second data line; and a second bypass auxiliary line disposed in the display area, extending in a second direction together with the data lines, paired with the first data line, and electrically connected between the first bypass auxiliary line and the second data supply line.

The demultiplexer circuit may further include a third demultiplexer transistor turned on by a third demultiplexer control signal supplied during a third period after the second period of each image frame period. The second data line may be electrically connected to the data driver through the second demultiplexer transistor and the second data line may include a transfer path longer than or equal to the first extension length and shorter than a second extension length. A third data line of the data lines may be electrically connected to the data driver through the third demultiplexer transistor and the third data line may include a transfer path longer than or equal to the second extension length.

The demultiplexer circuit may further include a fourth demultiplexer transistor turned on by a fourth demultiplexer control signal supplied during a fourth period after the third period of each image frame period. The third data line may be electrically connected to the data driver through the third demultiplexer transistor and the third data line may include a transfer path longer than or equal to the second extension length and shorter than a third extension length. A fourth data line of the data lines may be electrically connected to the data driver through the fourth demultiplexer transistor and the fourth data line may include a transfer path longer than or equal to the third extension length.

According to an aspect of the disclosure, there is provided a display device that may include a main area including a display area in which emission areas are disposed and a non-display area disposed around the display area and a sub-area protruding from a side of the main area; a circuit layer disposed on a substrate, the circuit layer including emission pixel drivers electrically connected to light emitting elements of the emission areas, respectively, and data lines transferring data signals of the emission pixel drivers; a data driver generating the data signals of the emission pixel drivers; and a demultiplexer circuit electrically connected between the data driver and the data lines. A transfer path between a first data line of the data lines and the demultiplexer circuit may be shorter than a first extension length. A transfer path between a second data line of the data lines and the demultiplexer circuit may be longer than or equal to a second extension length. The demultiplexer circuit outputs a data signal of the first data line during a first period of each image frame period and outputs a data signal of the second data line during a second period after the first period of each image frame period.

The data signal of the second data line may include a compensation value corresponding to the first extension length.

The data driver and the demultiplexer circuit may be disposed in the sub-area of the substrate. The first data line may be more adjacent to the sub-area than the second data line. The circuit layer may further include data supply lines extending from the sub-area to the display area and electrically connected between the data lines and the demultiplexer circuit. The transfer path between the first data line and the demultiplexer circuit may include a first data supply line electrically connected between the demultiplexer circuit and the first data line among the data supply lines. The transfer path between the second data line and the demultiplexer circuit may include a second data supply line electrically connected between the demultiplexer circuit and the second data line among the data supply lines.

The first data line may be directly electrically connected to the first data supply line. The transfer path between the second data line and the demultiplexer circuit may further include a first bypass auxiliary line disposed in the display area, extending in a first direction, and electrically connected to the second data line; and a second bypass auxiliary line disposed in the display area, extending in a second direction together with the data lines, paired with the first data line, and electrically connected between the first bypass auxiliary line and the second data supply line.

The demultiplexer circuit may include a first demultiplexer transistor turned on by a first demultiplexer control signal during the first period of each image frame period and electrically connected between the data driver and the first data supply line; and a second demultiplexer transistor turned on by a second demultiplexer control signal during the second period of each image frame period and electrically connected between the data driver and the second data supply line.

The transfer path between the second data line and the demultiplexer circuit may be longer than or equal to the first extension length and shorter than the second extension length. A transfer path between a third data line of the data lines and the demultiplexer circuit may be longer than or equal to the second extension length. The demultiplexer circuit outputs a data signal of the third data line during a third period after the second period of each image frame period.

The transfer path between the third data line and the demultiplexer circuit may be longer than or equal to the second extension length and shorter than a third extension length. A transfer path between a fourth data line of the data lines and the demultiplexer circuit may be longer than or equal to the third extension length. The demultiplexer circuit outputs a data signal of the fourth data line during a fourth period after the third period of each image frame period.

According to an aspect of the disclosure, there is provided a display device that may include a main area including a display area in which emission areas are disposed and a non-display area disposed around the display area and a sub-area protruding from a side of the main area; a circuit layer disposed on the substrate, the circuit layer including emission pixel drivers electrically connected to light emitting elements of the emission areas, respectively, and data lines transferring data signals of the emission pixel drivers; a data driver generating the data signals of the emission pixel drivers; and a demultiplexer circuit electrically connected between the data driver and the data lines, the demultiplexer circuit including a first demultiplexer transistor turned on by a first demultiplexer control signal and a second demultiplexer transistor turned on by a second demultiplexer control signal. The data lines may include a first data line and a second data line. The second data line of the first data line and the second data line may be more adjacent to the non-display area in a direction intersecting the data lines. The circuit layer may further include a first bypass auxiliary line disposed in the display area, extending in a first direction, and electrically connected to the second data line; and a second bypass auxiliary line disposed in the display area, extending in a second direction together with the data lines, paired with the first data line, and electrically connected between the first bypass auxiliary line and a second data supply line. The demultiplexer circuit may include a first demultiplexer transistor electrically connected between the first data line and the data driver; and a second demultiplexer transistor electrically connected between the second data line and the data driver.

The first transistor may be turned on by a first demultiplexer control signal supplied during a first period of each image frame period. The second demultiplexer transistor may be tuned on by a second demultiplexer control signal supplied during a second period after the first period of each image frame period.

The data driver and the demultiplexer circuit may be disposed in the sub-area of the substrate. The circuit layer may further include data supply lines extending from the sub-area to the display area and electrically connected between the data lines and the demultiplexer circuit. The first data line may be directly electrically connected to a first data supply line. The second data line may be electrically connected to the second data supply line through the first bypass auxiliary line and the second bypass auxiliary line.

The first data line may be electrically connected to the data driver through the first demultiplexer transistor and the first data line may include a transfer path shorter than a first extension length. The second data line may be electrically connected to the data driver through the second demultiplexer transistor and the second data line may include a transfer path longer than or equal to the first extension length. A data signal of the second data line may include a compensation value corresponding to the first extension length.

A display device according to embodiments may include a circuit layer including emission pixel drivers and data lines, a data driver generating data signals of the emission pixel drivers, and a demultiplexer circuit electrically connected between the data driver and the data lines.

The demultiplexer circuit may include a first demultiplexer transistor turned on by a first demultiplexer control signal and a second demultiplexer transistor turned on by a second demultiplexer control signal.

A first data line of the data lines may be electrically connected to the data driver through the first demultiplexer transistor and the first data line may include a transfer path shorter than a first extension length.

A second data line of the data lines may be electrically connected to the data driver through the second demultiplexer transistor and the second data line may include a transfer path longer than or equal to the first extension length.

For example, a data signal of the first data line and a data signal of the second data line may be output during different periods by the demultiplexer circuit. For this reason, the data driver may output the data signal of the second data line to which a compensation value corresponding to the first extension length is applied based on a data control signal of a timing controller.

Accordingly, it is possible to prevent distortion of the data signal of the second data line due to a transfer path of a relatively long length longer than or equal to the first extension length without changing the data driver. Therefore, it may be advantageous in increasing resolution or a size of the display device without being disadvantageous in slimming of the display device and reducing a manufacturing cost of the display device.

However, effects according to the embodiments of the disclosure are not limited to those described above and various other effects are incorporated herein.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
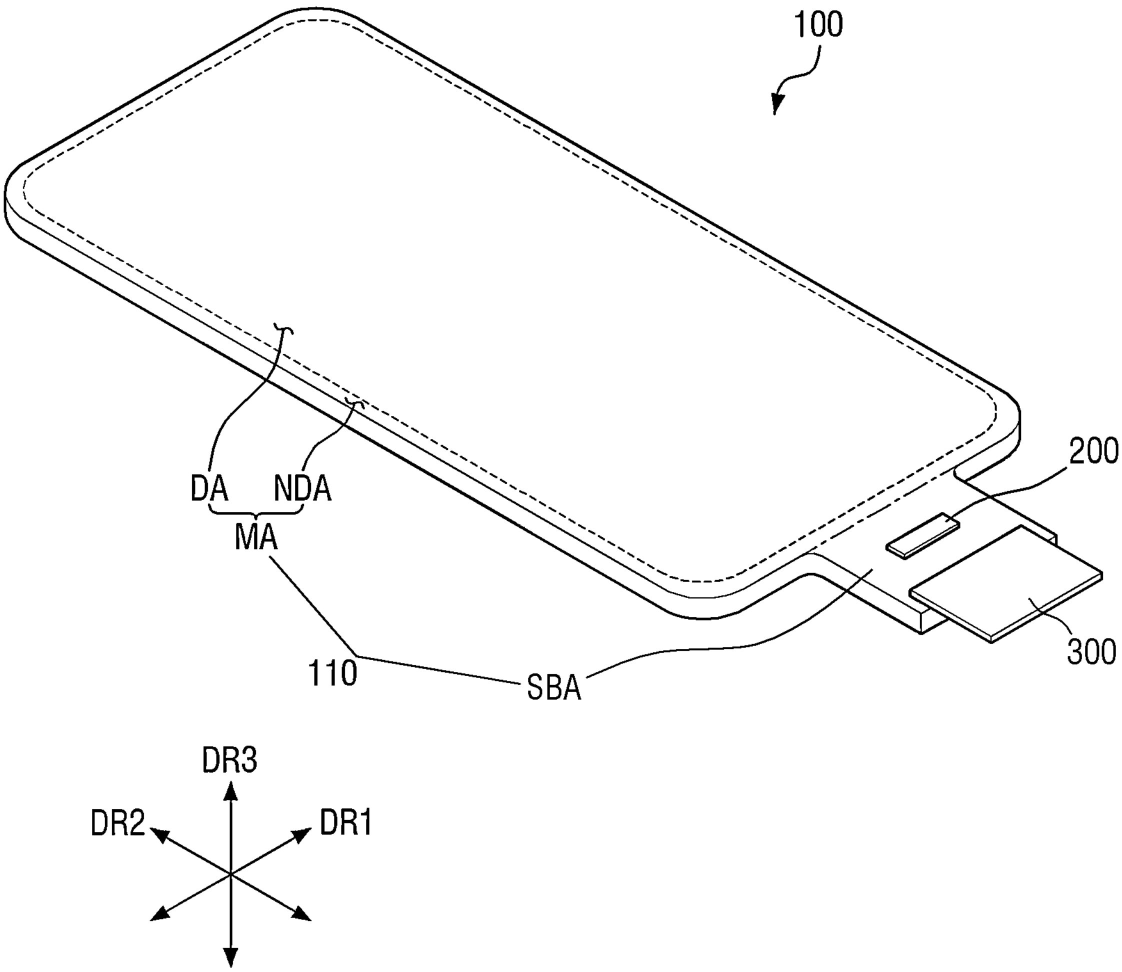
FIG. 1 is a schematic perspective view illustrating a display device according to embodiments.

Embodiments will now be described more fully hereinafter with reference to the accompanying drawings. The embodiments may, however, be provided in different forms and should not be construed as limiting. The same reference numbers indicate the same components throughout the disclosure. In the accompanying figures, the thickness of layers and regions may be exaggerated for clarity.

Some of the parts that are not associated with the description may not be provided in order to describe embodiments of the disclosure.

It will also be understood that when a layer is referred to as being "on" another layer or substrate, it can be directly on the other layer or substrate, or intervening layers may also be present. In contrast, when an element is referred to as being "directly on" another element, there may be no intervening elements present.

Further, the phrase “in a plan view” means when an object portion is viewed from above, and the phrase “in a schematic cross-sectional view” means when a schematic cross-section taken by vertically cutting an object portion is viewed from the side.

The terms “overlap” or “overlapped” mean that a first object may be above or below or to a side of a second object, and/or vice versa. Additionally, the term “overlap” may include layer, stack, face or facing, extending over, covering, or partly covering or any other suitable term as would be appreciated and understood by those of ordinary skill in the art. The expression “not overlap” may include a meaning such as “apart from” or “set aside from” or “offset from” and any other suitable equivalents as would be appreciated and understood by those of ordinary skill in the art.

The terms “face” and “facing” may mean that a first object may directly or indirectly oppose a second object. In a case in which a third object intervenes between a first and second object, the first and second objects may be understood as being indirectly opposed to one another, although still facing each other.

The spatially relative terms “below,” “beneath,” “lower,” “above,” “upper,” or the like, may be used herein for case of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned “below” or “beneath” another device may be placed “above” another device. Accordingly, the illustrative term “below” may include both the lower and upper positions. The device may also be oriented in other directions and thus the spatially relative terms may be interpreted differently depending on the orientations.

When an element is referred to as being “connected” or “coupled” to another element, the element may be “directly connected” or “directly coupled” to another element, or “electrically connected” or “electrically coupled” to another element with one or more intervening elements interposed therebetween.

It will be further understood that when the terms “comprises,” “comprising,” “has,” “have,” “having,” “includes” and/or “including” are used, they may specify the presence of stated features, integers, steps, operations, elements and/or components, but do not preclude the presence or addition of other features, integers, steps, operations, elements, components, and/or any combination thereof.

It will be understood that, although the terms “first,” “second,” “third,” or the like may be used herein to describe various elements, these elements should not be limited by these terms. These terms are used to distinguish one element from another element or for the convenience of description and explanation thereof. For example, when “a first element” is discussed in the description, it may be termed “a second element” or “a third element,” and “a second element” and “a third element” may be termed in a similar manner without departing from the spirit and scope of the disclosure herein.

The terms “about” or “approximately” as used herein is inclusive of the stated value and means within an acceptable range of deviation for the particular value as determined by one of ordinary skill in the art, considering the measurement in question and the error associated with measurement of the particular quantity (for example, the limitations of the measurement system). For example, “about” may mean within one or more standard deviations, or within ±30%, 20%, 10%, 5% of the stated value.

In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

In the specification and the claims, the phrase “at least one of” is intended to include the meaning of “at least one selected from the group of” for the purpose of its meaning and interpretation. For example, “at least one of A and B” may be understood to mean “A, B, or A and B.”

Unless otherwise defined or implied, all terms used herein (including technical and scientific terms) have the same meaning as commonly understood by those skilled in the art to which the disclosure pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, embodiments will be described with reference to the accompanying drawings.

Figure 2:
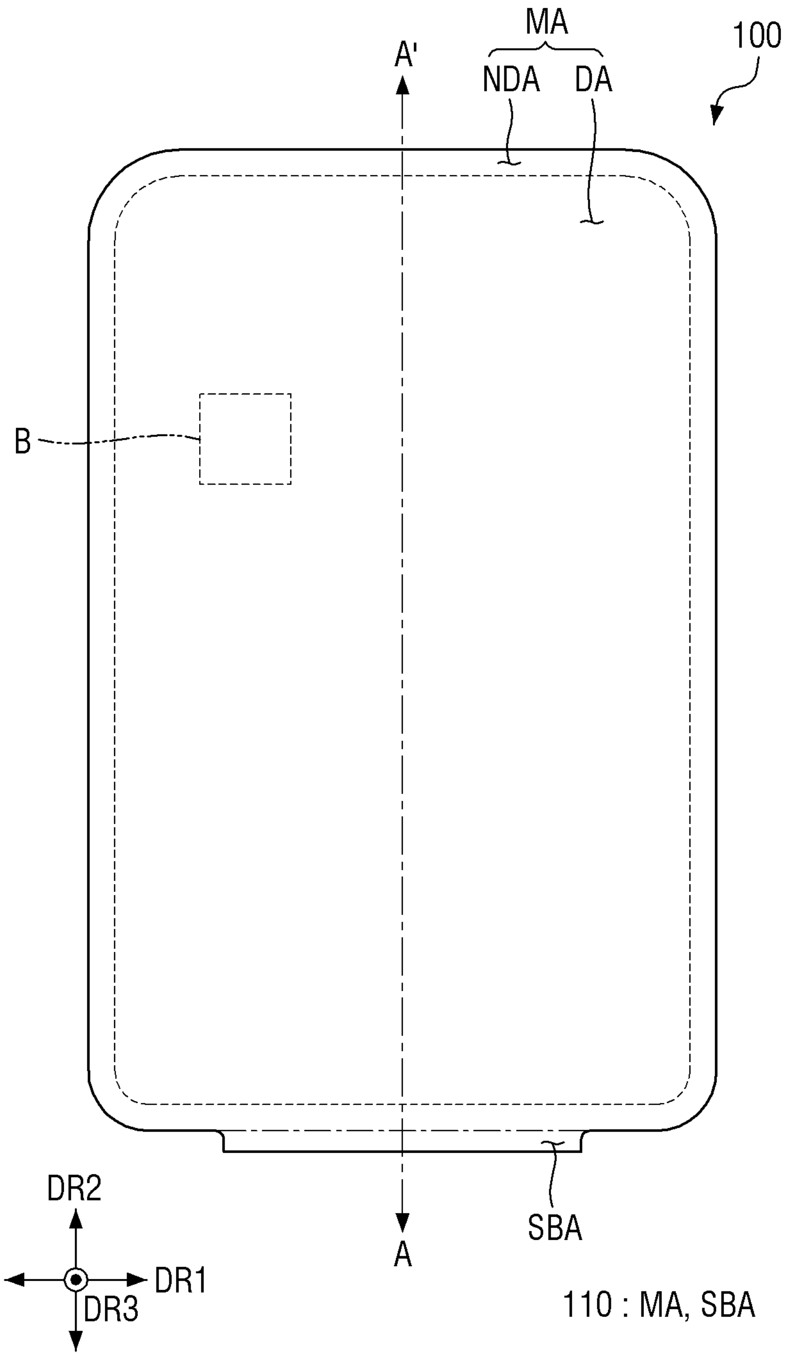
FIG. 2 is a schematic plan view illustrating the display device of FIG. 1.
Figure 3:
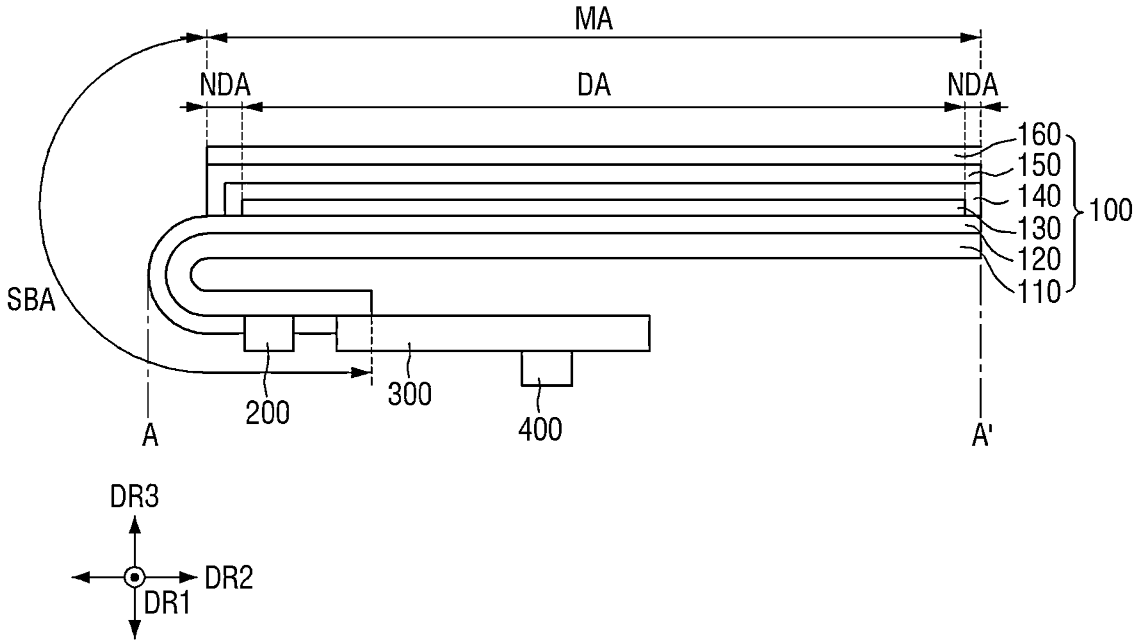
FIG. 3 is a schematic cross-sectional view taken along line A-A' of FIG. 2.

FIG. 1 is a schematic perspective view illustrating a display device according to embodiments. FIG. 2 is a schematic plan view illustrating the display device of FIG. 1. FIG. 3 is a schematic cross-sectional view taken along line A-A' of FIG. 2.

Referring to FIGS. 1 and 2, a display device 100 is a device that displays a moving image or a still image, and may be used as a display screen of various products such as televisions, laptop computers, monitors, billboards, and the Internet of Things (IOT) as well as portable electronic devices such as mobile phones, smartphones, tablet personal computers (PCs), smart watches, watch phones, mobile communication terminals, electronic notebooks, electronic books, portable multimedia players (PMPs), navigation devices, and ultra mobile PCs (UMPCs).

The display device 100 may be a light emitting display device such as an organic light emitting display device using organic light emitting diodes, a quantum dot light emitting display device including quantum dot light emitting layers, an inorganic light emitting display device including inorganic semiconductors, and a micro light emitting display device using micro or nano light emitting diodes (micro LEDs or nano LEDs). Hereinafter, it will be described that the display device 100 is an organic light emitting display device. However, the disclosure is not limited thereto, and may be applied to a display device including an organic insulating material, an organic light emitting material, and a metal material.

The display device 100 may be formed to be flat, but is not limited thereto. For example, the display device 100 may include curved surface parts formed at left and right ends thereof and having a constant curvature or a variable curvature. The display device 100 may be flexibly formed to be curved, bent, folded, or rolled.

As illustrated in FIGS. 1 to 3, the display device 100 includes a substrate 110.

The substrate 110 may include a main area MA corresponding to a display surface of the display device 100 and a sub-area SBA protruding from one side or a side of the main area MA.

As illustrated in FIG. 2, the main area MA may include a display area DA disposed at most of the center thereof and a non-display area NDA positioned around the display area DA.

The display area DA may be formed in a rectangular shape, in plan view, having short sides in a first direction DR1 and long sides in a second direction DR2 intersecting the first direction DR1. A corner where the short side in the first direction DR1 and the long side in the second direction DR2 meet may be rounded with a selectable curvature or may be right-angled. The shape of the display area DA in plan view is not limited to the rectangular shape, and may be other polygonal shapes, a circular shape, or an elliptical shape.

The non-display area NDA may be disposed at an edge of the main area MA so as to surround the display area DA.

The sub-area SBA may be an area protruding from the non-display area NDA of the main area MA to one side or a side in the second direction DR2.

A portion of the sub-area SBA is transformed into a curved shape, such that another portion of the sub-area SBA may be disposed on a rear surface of the display device 100.

FIGS. 2 and 3 illustrate the display device 100 in a state in which a portion of the sub-area SBA is bent.

Referring to FIG. 3, the display device 100 according to embodiments includes a substrate 110, a circuit layer 120 disposed on the substrate 110, and an element layer 130 disposed on the circuit layer 120.

The display device 100 according to embodiments may further include a sealing layer 140 disposed on the element layer 130, and a touch sensor layer 150 disposed on the sealing layer 140.

The display device 100 according to embodiments may further include a polarization layer 160 disposed on the touch sensor layer 150 in order to reduce external light reflection.

The substrate 110 may be made of an insulating material such as a polymer resin. For example, the substrate 110 may be made of polyimide. The substrate 110 may be a flexible substrate that may be bent, folded, and rolled.

By way of example, the substrate 110 may be made of an insulating material such as glass.

The substrate 110 may include a main area MA and a sub-area SBA. The main area MA may include a display area DA and a non-display area NDA.

Figure 4:
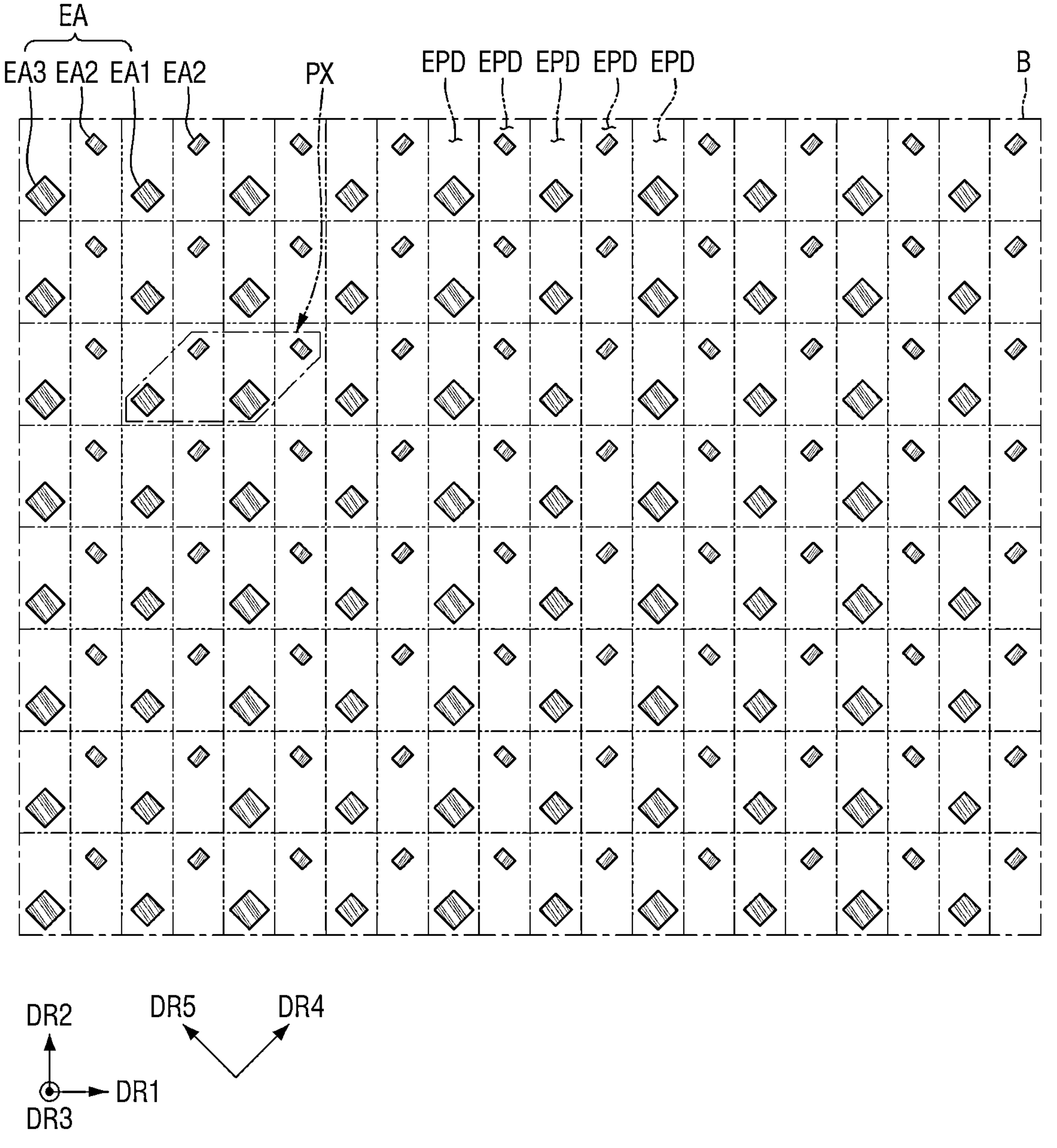
FIG. 4 is a plan diagram illustrating portion B of FIG. 2.

FIG. 4 is a plan diagram illustrating portion B of FIG. 2.

Referring to FIG. 4, the display area DA of the display device 100 according to embodiments may include emission areas EA. The display area DA may further include a non-emission area NEA disposed in a spaced portion between the emission areas EA.

Emission pixel drivers EPD each corresponding to the emission areas EA may be arranged (or disposed) side by side in the first direction DR1 and the second direction DR2 in the display area DA. The emission pixel drivers EPD may be electrically connected respectively to light emitting elements LEL (see FIG. 6) of the element layer 130 each disposed in the emission areas EA.

The emission areas EA may have a rhombic shape in plan view or a rectangular shape in plan view. However, this is only an example, and the shape of the emission areas EA in plan view according to an embodiment is not limited to that illustrated in FIG. 4. For example, the emission areas EA may have a polygonal shape such as a quadrangular shape, a pentagonal shape, or a hexagonal shape in plan view or have a circular shape or an elliptical shape, in plan view, including curved edges.

The emission areas EA may include first emission areas EA1 emitting light of a first color in a selectable wavelength band, second emission areas EA2 emitting light of a second color in a wavelength band lower than that of the first color, and third emission areas EA3 emitting light of a third color in a wavelength band lower than that of the second color.

As an example, the first color may be red corresponding to a wavelength band in a range of about 600 nm to about 750 nm. The second color may be green corresponding to a wavelength band in a range of about 480 nm to about 560 nm. The third color may be blue corresponding to a wavelength band in a range of about 370 nm to about 460 nm.

The first emission areas EA1 and the third emission areas EA3 may be alternately disposed in at least one of the first direction DR1 and the second direction DR2.

The second emission areas EA2 may be arranged (or disposed) side by side in at least one of the first direction DR1 and the second direction DR2.

The second emission areas EA2 may neighbor to the first emission areas EA1 and the third emission areas EA3 in diagonal directions DR4 and DR5 intersecting the first direction DR1 and the second direction DR2.

Pixels PX displaying each luminance and color may be provided by the first emission areas EA1, the second emission areas EA2, and the third emission areas EA3 adjacent to each other among such emission areas EA.

In other words, pixels PX may be basic units displaying various colors including white at a selectable luminance.

Each of the pixels PX may include at least one first emission area EA1, at least one second emission area EA2, and at least one third emission area EA3 adjacent to each other. Accordingly, each of the pixels PX may display various colors through mixing of lights emitted from the first emission areas EA1, the second emission areas EA2, and the third emission areas EA3 adjacent to each other.

Figure 5:
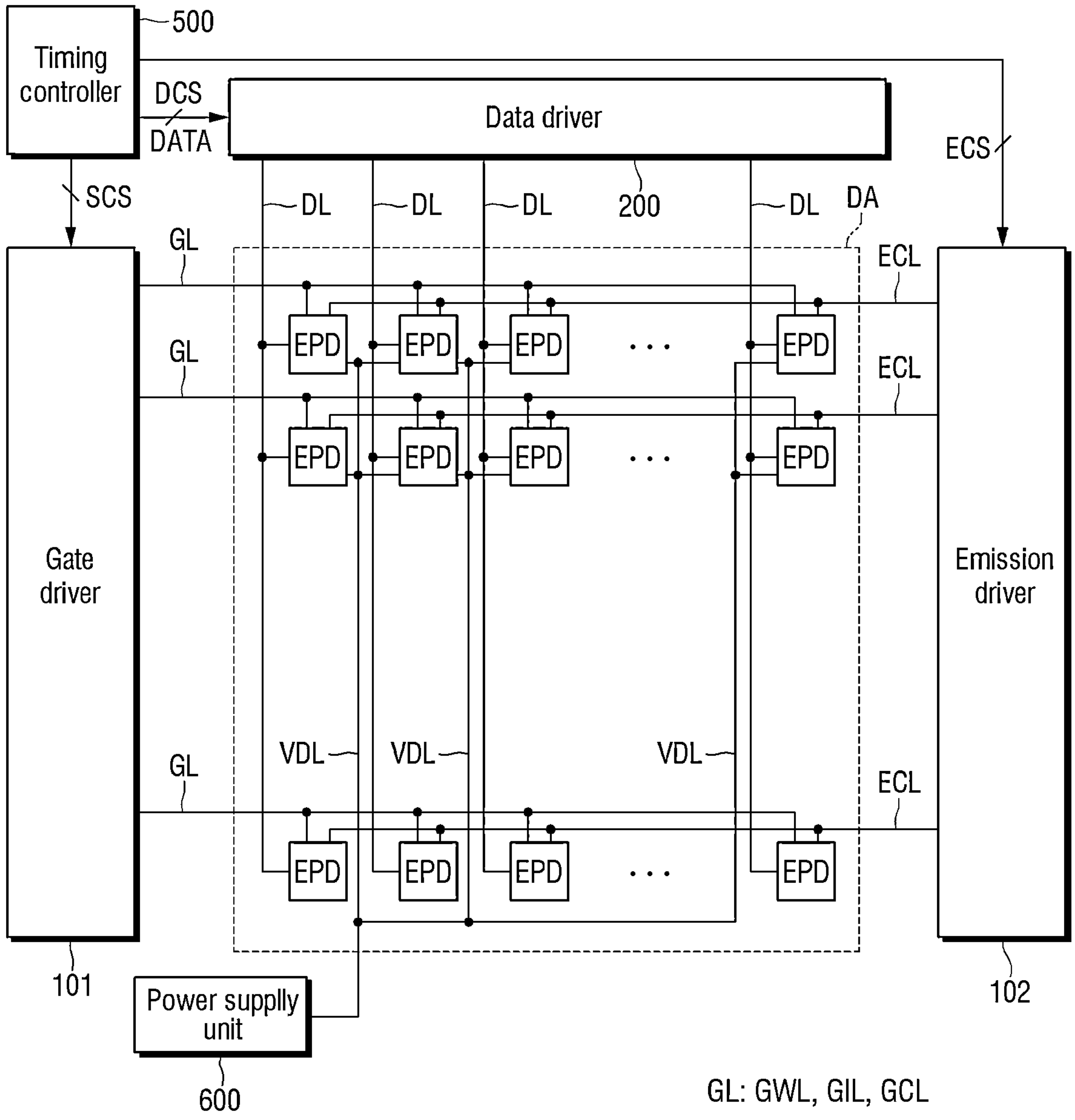
FIG. 5 is a block diagram illustrating a circuit layer of FIG. 3.

FIG. 5 is a block diagram illustrating a circuit layer of FIG. 3.

Referring to FIG. 5, the circuit layer 120 of the display device 100 according to embodiments may include emission pixel drivers EPD each corresponding to the emission areas EA of the display area DA and data lines DL electrically connected to the emission pixel drivers EPD.

The display device 100 according to embodiments may include a data driver 200 transferring data signals Vdata (see FIG. 6) of the emission pixel drivers EPD to the data lines DL.

The display device 100 according to embodiments may further include a gate driver 101 supplying one or more gate signals to the emission pixel drivers EPD, an emission driver 102 supplying an emission control signal EC (see FIG. 6) to the emission pixel drivers EPD, a timing controller 500 controlling a driving timing, and a power supply unit 600 supplying various power and voltages to the emission pixel drivers EPD.

The timing controller 500 receives an image signal supplied from the outside of the display device 100.

The timing controller 500 may output image data DATA and a data control signal DCS to the data driver 200.

The timing controller 500 may generate a scan control signal SCS for controlling an operation timing of a gate driver 101 and an emission control signal ECS for controlling an operation timing of the emission driver 102.

For example, the timing controller 500 may generate the scan control signal SCS and the emission control signal ECS, output the scan control signal SCS to the gate driver

101 through a scan control line, and output the emission control signal ECS to the emission driver 102 through an emission control line.

The data driver 200 may convert the image data DATA into analog data voltages and output the analog data voltages to the data lines DL.

The gate driver 101 may generate gate signals according to the scan control signal SCS and sequentially output the gate signals to gate lines GL. The gate lines GL may include a scan write line GWL (see FIG. 6) transferring a scan write signal GW (see FIG. 6), a scan initialization line GIL (see FIG. 6) transferring a scan initialization signal GI (see FIG. 6), and a gate control line GCL (see FIG. 6) transferring a gate control signal GC (see FIG. 6).

The emission driver 102 may sequentially output emission control signals EC (see FIG. 6) to emission control lines ECL according to the emission control signal ECS. The emission control signals EC of the emission driver 102 may have pulses of a first level voltage or a second level voltage. The emission driver 102 may not be provided separately from the gate driver 101, but may be embedded in the gate driver 101.

The power supply unit 600 may supply various power required to drive the emission pixel drivers EPD and the light emitting elements LEL.

As an example, the power supply unit 600 may supply first power ELVDD (see FIG. 6) and second power ELVSS (see FIG. 6) for driving the light emitting elements LEL and initialization power Vint (see FIG. 6) for initializing the emission pixel drivers EPD.

Figure 6:
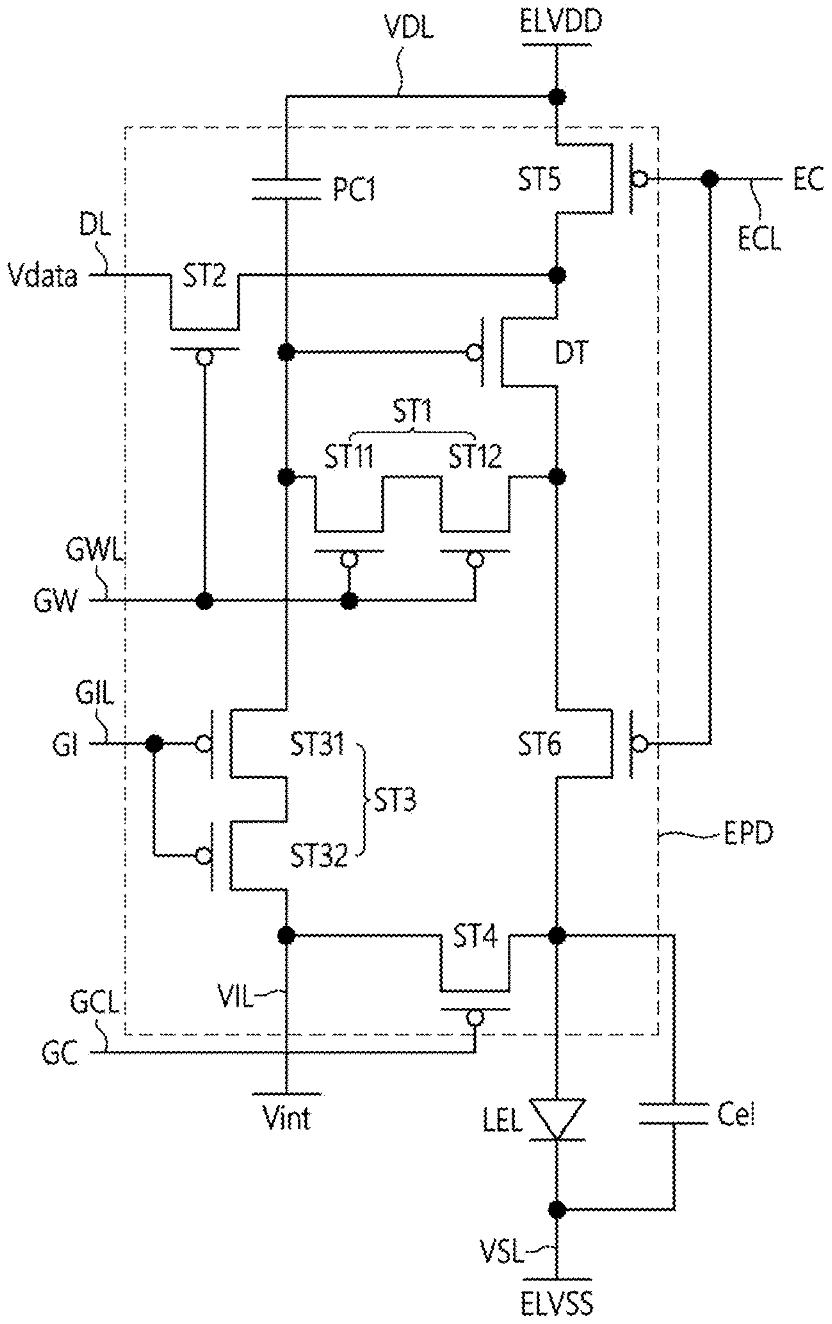
FIG. 6 is a schematic diagram of an equivalent circuit illustrating an emission pixel driver illustrated in FIGS. 4 and 5.

FIG. 6 is a schematic diagram of an equivalent circuit illustrating an emission pixel driver illustrated in FIGS. 4 and 5.

Referring to FIG. 6, one light emitting element LEL of the light emitting elements LEL of the element layer 130 may be electrically connected between one emission pixel driver EPD of the emission pixel drivers EPD of the circuit layer 120 and the second power ELVSS.

For example, an anode electrode 131 (see FIG. 7) of the light emitting element LEL may be electrically connected to the emission pixel driver EPD, and the second power ELVSS having a lower voltage level than the first power ELVDD may be applied to a cathode electrode 134 (see FIG. 7) of the light emitting element LEL.

A capacitor Cel connected to the light emitting element LEL in parallel indicates parasitic capacitance between the anode electrode 131 and the cathode electrode 134.

The circuit layer 120 may further include a first power line VDL transferring the first power ELVDD and an initialization power line VIL transferring the initialization power Vint.

The circuit layer 120 may further include a scan write line GWL transferring a scan write signal GW, a scan initialization line GIL transferring a scan initialization signal GI, an emission control line ECL transferring an emission control signal EC, and a gate control line GCL transferring a gate control signal GC.

One emission pixel driver EPD of the circuit layer 120 may include a driving transistor DT generating a driving current for driving the light emitting element LEL, two or more transistors ST1 to ST6 electrically connected to the driving transistor DT, and at least one capacitor PC1.

The driving transistor DT is connected to the light emitting element LEL in series between the first power ELVDD and the second power ELVSS.

For example, a first electrode (for example, a source electrode) of the driving transistor DT may be electrically connected to the first power line VDL through a fifth transistor ST5. A second electrode (for example, a drain electrode) of the driving transistor DT may be electrically connected to the anode electrode 131 of the light emitting element LEL through a sixth transistor ST6.

The first electrode of the driving transistor DT may be electrically connected to a data line DL through a second transistor ST2.

A gate electrode of the driving transistor DT may be electrically connected to the first power line VDL through the first capacitor PC1. For example, the first capacitor PC1 may be electrically connected between the gate electrode of the driving transistor DT and the first power line VDL.

Accordingly, a potential of the gate electrode of the driving transistor DT may be maintained as the first power ELVDD by the first power line VDL.

In case that a data signal Vdata of the data line DL is transferred to the first electrode of the driving transistor DT through the turned-on second transistor ST2, a voltage difference corresponding to the first power ELVDD and the data signal Vdata may be generated between the gate electrode of the driving transistor DT and the first electrodes of the driving transistor DT.

In case that the voltage difference between the gate electrode of the driving transistor DT and the first electrode of the driving transistor DT, for example, a voltage difference between a gate and a source of the driving transistor, is greater than or equal to a threshold voltage, the driving transistor DT is turned on, such that a drain-source current of the driving transistor DT corresponding to the data signal Vdata may be generated.

Subsequently, in case that the fifth transistor ST5 and the sixth transistor ST6 are turned on, the driving transistor DT may be connected to the light emitting element LEL in series between the first power line VDL and a second power line VSL. Accordingly, the drain-source current of the driving transistor DT corresponding to the data signal Vdata may be supplied as a driving current of the light emitting element LEL.

Accordingly, the light emitting element LEL may emit light of luminance corresponding to the data signal Vdata.

A first transistor ST1 may be electrically connected between the gate electrode of the driving transistor DT and the second electrode of the driving transistor DT. The first transistor ST1 may be turned on by the scan write signal GW of the scan write line GWL.

The second transistor ST2 may be electrically connected between the first electrode of the driving transistor DT and the data line DL. The second transistor ST2 may be turned on by the scan write signal GW of the scan write line GWL.

A third transistor ST3 may be connected between the gate electrode of the driving transistor DT and the initialization power line VIL. The third transistor ST3 may be turned on by the scan initialization signal GI of the scan initialization line GIL.

A fourth transistor ST4 may be electrically connected between the anode electrode 131 of the light emitting element LEL and the initialization power line VIL. The fourth transistor ST4 may be turned on by the gate control signal GC of the gate control line GCL.

The fifth transistor ST5 may be electrically connected between the first electrode of the driving transistor DT and the first power line VDL.

The sixth transistor ST6 may be electrically connected between the second electrode of the driving transistor DT and the anode electrode 131 of the light emitting element LEL.

The fifth transistor ST5 and the sixth transistor ST6 may be turned on by the emission control signal EC of the emission control line ECL.

As illustrated in FIG. 6, the driving transistor DT and the first to sixth transistors ST1 to ST6 may be provided as P-type metal oxide semiconductor field effect transistors (MOSFETs). However, this is only an example, and the driving transistor DT and some or a number of the first to sixth transistors ST1 to ST6 may also be provided as N-type MOSFETs. As an example, the first transistor ST1 and the third transistor ST3 may be provided as N-type MOSFETs. The first transistor ST1 may include further transistors ST11 and ST12. The third transistor ST3 may include further transistors ST31 and ST32.

Figure 7:
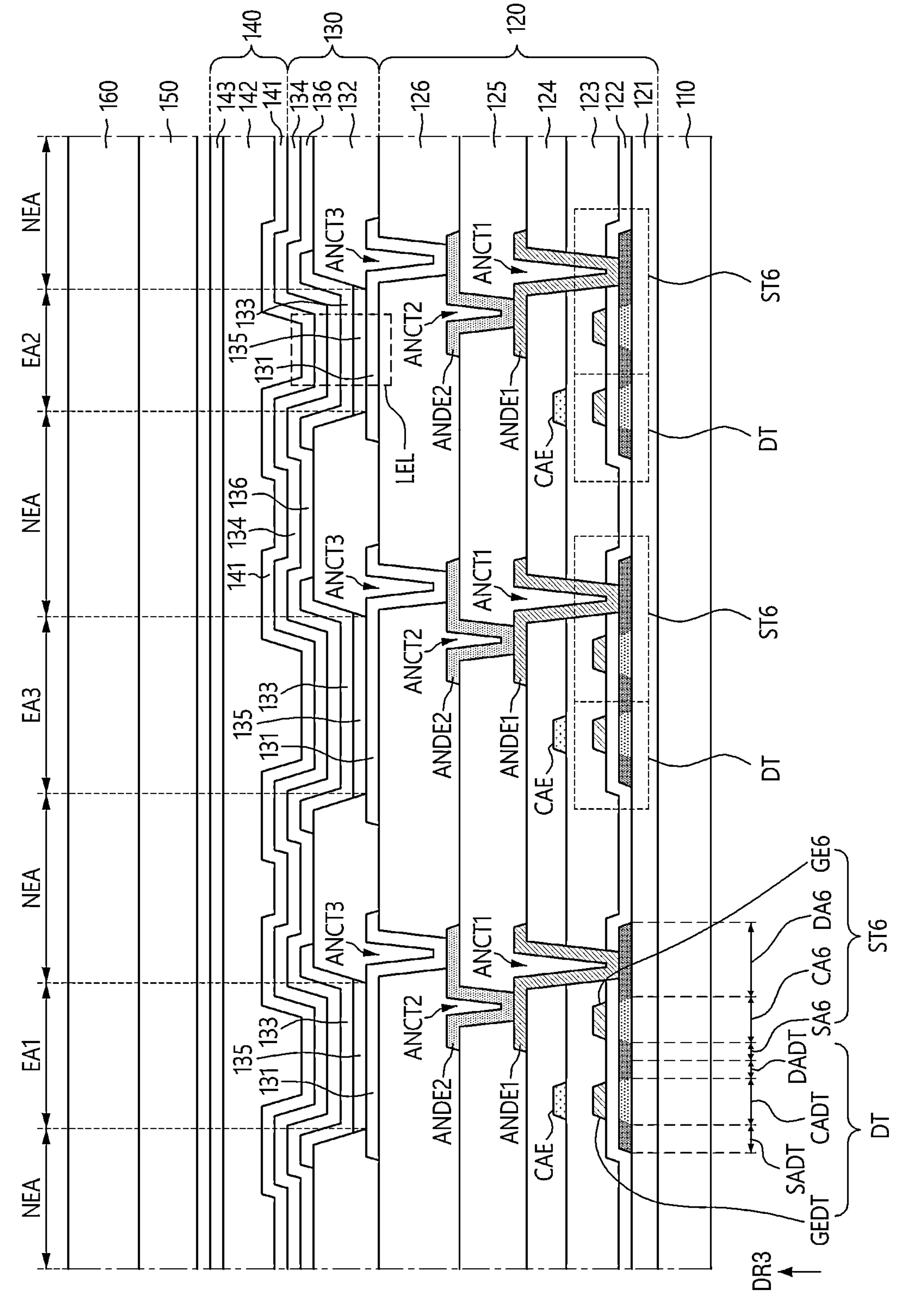
FIG. 7 is a schematic cross-sectional view illustrating a driving transistor, a sixth transistor, and a light emitting element illustrated in FIG. 6.

FIG. 7 is a schematic cross-sectional view illustrating a driving transistor, a sixth transistor, and a light emitting element illustrated in FIG. 6.

Referring to FIG. 7, the display device 100 according to embodiments may include a substrate 110, a circuit layer 120 disposed on the substrate 110, an element layer 130 disposed on the circuit layer 120, a sealing layer 140 disposed on the element layer 130, and a touch sensor layer 150 disposed on the sealing layer 140.

The display device 100 according to embodiments may further include a polarization layer 160 disposed on the touch sensor layer 150.

The substrate 110 may be made of an insulating material such as a polymer resin. As an example, the substrate 110 may include polyimide.

The circuit layer 120 may include the emission pixel drivers EPD each electrically connected to the light emitting elements LEL disposed in the emission areas EA.

The emission pixel drivers EPD may include the driving transistor DT and two or more transistors ST1 to ST6 electrically connected to the driving transistor DT.

According to embodiments, each of the driving transistor DT and the two or more transistors ST1 to ST6 may include a channel region CA6, a source region SA6, and a drain region DA6 formed as a semiconductor layer and a gate electrode GE6 formed as a first gate conductive layer on a first gate insulating layer 122 covering the semiconductor layer.

The source region SA6 and the drain region DA6 may be connected to both sides of the channel region CA6, respectively. The source region SA6 and the drain region DA6 may have higher conductivity than the channel region CA6.

The gate electrode GE6 overlaps the channel region CA6.

The first capacitor PC1 of each of the pixel drivers EPD may be provided as an overlapping area between a gate electrode GEDT of the driving transistor DT and a capacitor electrode CAE. The capacitor electrode CAE may be formed as a second gate conductive layer on a second gate insulating layer 123 covering the first gate conductive layer.

The anode electrode 131 of the element layer 130 may be electrically connected to a drain region DA6 of the sixth transistor ST6 through a first anode connection electrode ANDE1 and a second anode connection electrode ANDE2.

The first anode connection electrode ANDE1 may be formed as a first source-drain conductive layer on an interlayer insulating layer 124 covering the second gate conductive layer. Such a first anode connection electrode ANDE1 may be electrically connected to the drain region DA6 of the sixth transistor ST6 through a first anode contact hole ANCT1 penetrating through the interlayer insulating layer 124, the second gate insulating layer 123, and the first gate insulating layer 122.

The second anode connection electrode ANDE2 may be formed as a second source-drain conductive layer on a first planarization layer 125 covering the first source-drain conductive layer. Such a second anode connection electrode ANDE2 may be electrically connected to the first anode connection electrode ANDE1 through a second anode contact hole ANCT2 penetrating through the first planarization layer 125.

The anode electrode 131 of the element layer 130 may be disposed on a second planarization layer 126 covering the second source-drain conductive layer. Such an anode electrode 131 may be electrically connected to the second anode connection electrode ANDE2 through a third anode contact hole ANCT3 penetrating through the second planarization layer 126.

In other words, the circuit layer 120 may include a buffer layer 121 disposed on the substrate 110, the semiconductor layer CADT, SADT, DADT, CA6, SA6, and DA6 disposed on the buffer layer 121, the first gate insulating layer 122 covering the semiconductor layer, the first gate conductive layer GEDT and GE6 disposed on the first gate insulating layer 122, the second gate insulating layer 123 covering the first gate conductive layer, the second gate conductive layer CAE disposed on the gate insulating layer 123, the interlayer insulating layer 124 covering the second gate conductive layer, the first source-drain conductive layer ADNE1 disposed on the interlayer insulating layer 124, the first planarization layer 125 covering the first source-drain conductive layer, the second source-drain conductive layer ANDE2 disposed on the first planarization layer 125, and the second planarization layer 126 covering the second source-drain conductive layer.

Each of the buffer layer 121, the first gate insulating layer 122, the second gate insulating layer 123, and the interlayer insulating layer 124 may be formed as at least one inorganic film. As an example, each of the buffer layer 121, the first gate insulating layer 122, the second gate insulating layer 123, and the interlayer insulating layer 124 may be formed as multilayer films in which one or more inorganic films made of silicon nitride, silicon oxynitride, silicon oxide, titanium oxide, and aluminum oxide are alternately stacked each other.

Each of the first planarization layer 125 and the second planarization layer 126 may be formed as an organic film made of an acrylic resin, an epoxy resin, a phenolic resin, a polyamide resin, a polyimide resin, or the like within the spirit and the scope of the disclosure.

The semiconductor layer CADT, SADT, DADT, CA6, SA6, and DA6 may be made of one semiconductor material of polysilicon, amorphous silicon, and an oxide semiconductor.

The channel region CA6 of the semiconductor layer overlapping the gate electrode GE6 may maintain semiconductor characteristics, and the remaining source region SA6 and drain region DA6 of the semiconductor layer may be made to be conductive.

Each of the first gate conductive layer, the second gate conductive layer, the first source-drain conductive layer, and the second source-drain conductive layer may be formed as multiple layers made of two or more of molybdenum (Mo), aluminum (Al), chromium (Cr), gold (Au), titanium (Ti), nickel (Ni), neodymium (Nd), and copper (Cu).

The element layer 130 may include the light emitting elements LEL each disposed in the emission areas EA.

Each of the light emitting elements LEL may include an anode electrode 131 and a cathode electrode 134 facing each other, and a light emitting layer 133 disposed between the anode electrode 131 and the cathode electrode 134. By way of example, each of the light emitting elements LEL may further include a first common layer 135 disposed between the anode electrode 131 and the light emitting layer 133 and a second common layer 136 disposed between the light emitting layer 133 and the cathode electrode 134. That is, the element layer 130 may include the anode electrodes 131 respectively disposed in the emission areas EA, a pixel defining layer 132 disposed in the non-emission area NEA and covering the edge of the anode electrode 131, the first common layers 135 respectively disposed on the anode electrodes 131, the light emitting layers 133 respectively disposed on the first common layers 135, the second common layer 136 corresponding to the emission areas EA and disposed on the light emitting layers 133 and the pixel defining layer 132, and the cathode electrode 134 disposed on the second common layer 136.

The first common layer 135 may include a hole transporting layer. By way of example, the first common layer 135 may further include a hole injection layer between the anode electrode 131 and the hole transporting layer.

The light emitting layer 133 on the first common layer 135 may be disposed in each of the emission areas EA. The light emitting layer 133 of the first emission area EA1, the light emitting layer 133 of the second emission area EA2, and the light emitting layer 133 of the third emission area EA3 may include different materials or different contents of organic light emitting materials.

As an example, the light emitting layer 133 may be made of an organic light emitting material converting electron-hole pairs into light. The organic light emitting material may include a host material and a dopant. The dopant may include a phosphorescent material or a fluorescent material.

The second common layer 136 below the cathode electrode 134 may be entirely disposed in the display area DA including the emission areas EA. The second common layer 136 may include an electron transporting layer. By way of example, the second common layer 136 may further include an electron injection layer between the cathode electrode 134 and the electron transporting layer.

The sealing layer 140 may be disposed on the circuit layer 120 and may cover the element layer 130.

The sealing layer 140 may include a first sealing layer 141 disposed on the element layer 130 and made of an inorganic insulating material, a second sealing layer 142 disposed on the first sealing layer 141, overlapping the element layer 130, and made of an organic insulating material, and a third sealing layer 143 disposed on the first sealing layer 141, covering the second sealing layer 142, and made of an inorganic insulating material.

The second sealing layer 142 may be made of an organic insulating material such as an acrylic resin, an epoxy resin, a phenolic resin, a polyamide resin, or a polyimide resin.

Figure 8:
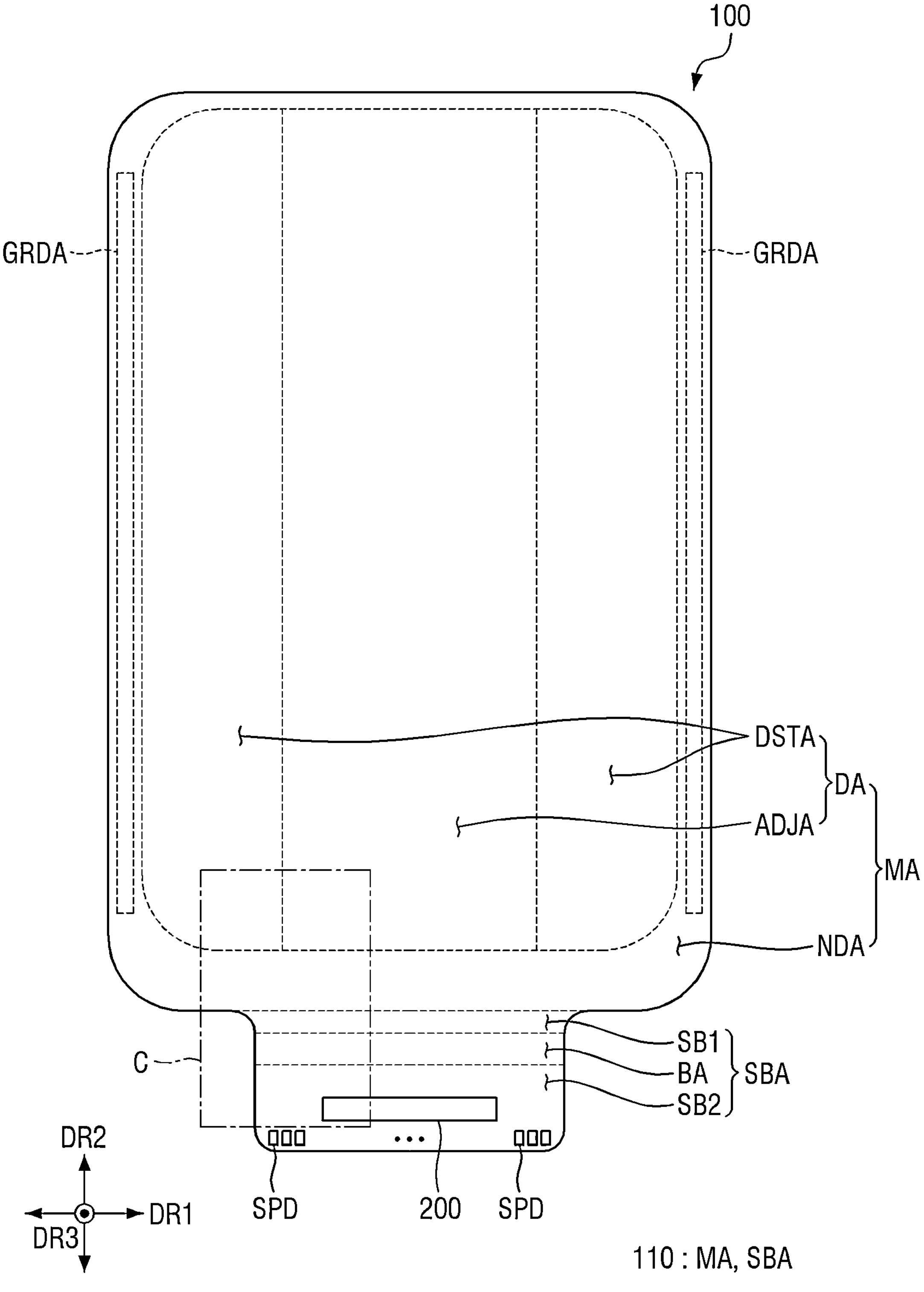
FIG. 8 is a schematic plan view illustrating a substrate of FIG. 2 according to embodiments.

FIG. 8 is a schematic plan view illustrating a substrate of FIG. 2 according to embodiments.

Referring to FIG. 8, the substrate 110 of the display device 100 according to embodiments includes a main area MA corresponding to a display surface and a sub-area SBA protruding from one side or a side of the main area MA.

The main area MA includes a display area DA disposed at most of the center thereof and a non-display area NDA disposed at an edge thereof and surrounding the display area DA.

The display area DA may include an adjacent area ADJA facing the sub-area SBA in the second direction DR2 and spaced areas DSTA disposed between the adjacent area ADJA and the non-display area NDA in the first direction DR1.

The display area DA may include the spaced areas DSTA each in contact with to both sides of the adjacent area ADJA in the first direction DR1.

The non-display area NDA may include a gate driver area GRDA in which the gate driver 101 and the emission driver 102 are disposed.

The gate driver area GRDA may be disposed in a portion of the non-display area NDA adjacent to at least one side or a side of the display area DA in the first direction DR1.

The sub-area SBA may include a bending area BA transformed into a bent shape, a first sub-area SB1 disposed between one side or a side of the bending area BA and the main area MA, and a second sub-area SB2 connected to the other side of the bending area BA.

In case that the bending area BA is transformed into the bent shape, the second sub-area SB2 is disposed below the substrate 110 and overlaps the main area MA.

The data driver 200 may be disposed in the second sub-area SB2.

Signal pads SPD bonded to a circuit board 300 may be disposed at an edge of one side or a side of the second sub-area SB2.

Figure 9:
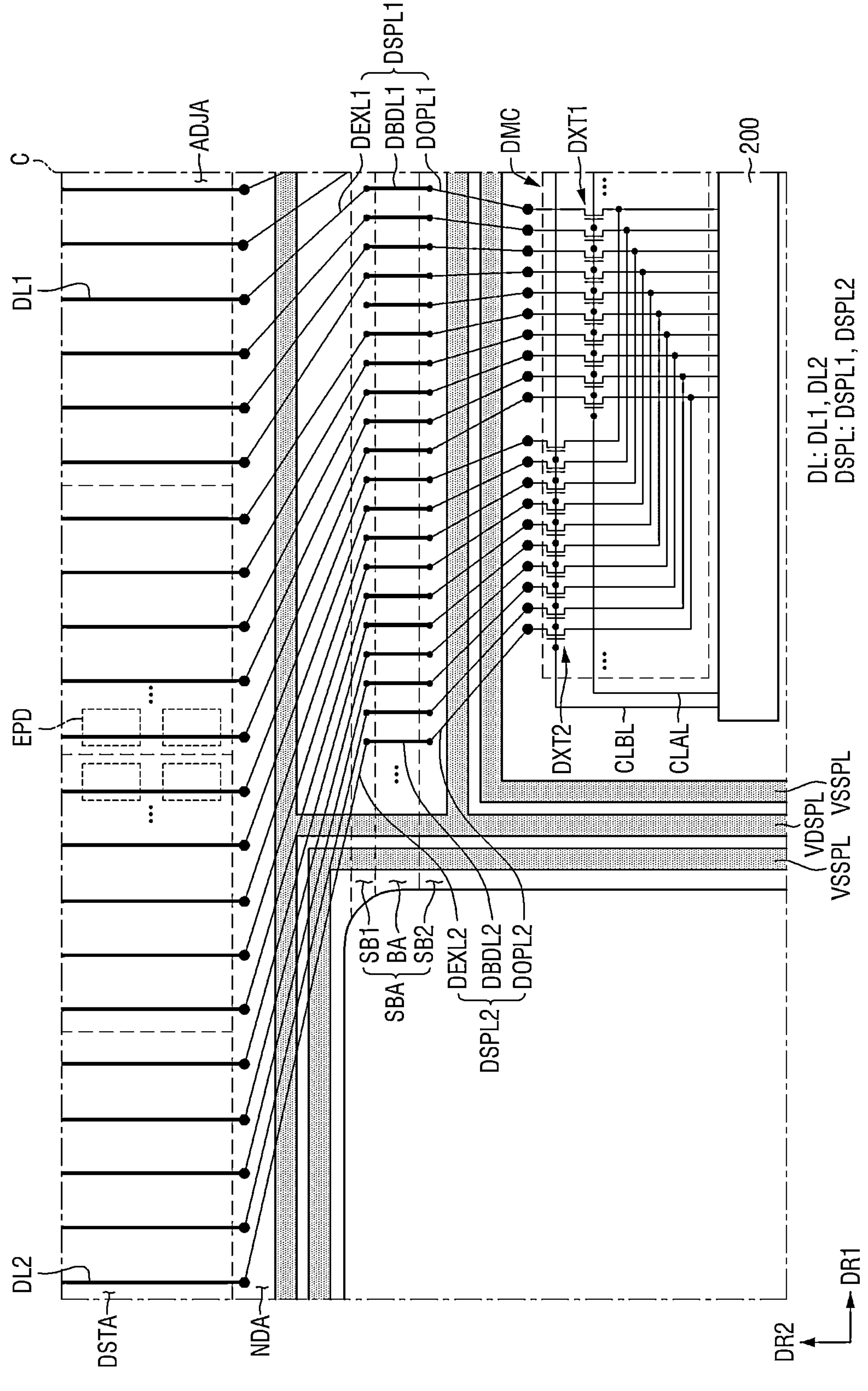
FIG. 9 is a plan diagram illustrating portion C of FIG. 8 according to embodiments.

FIG. 9 is a plan diagram illustrating portion C of FIG. 8 according to embodiments.

Figure 10:
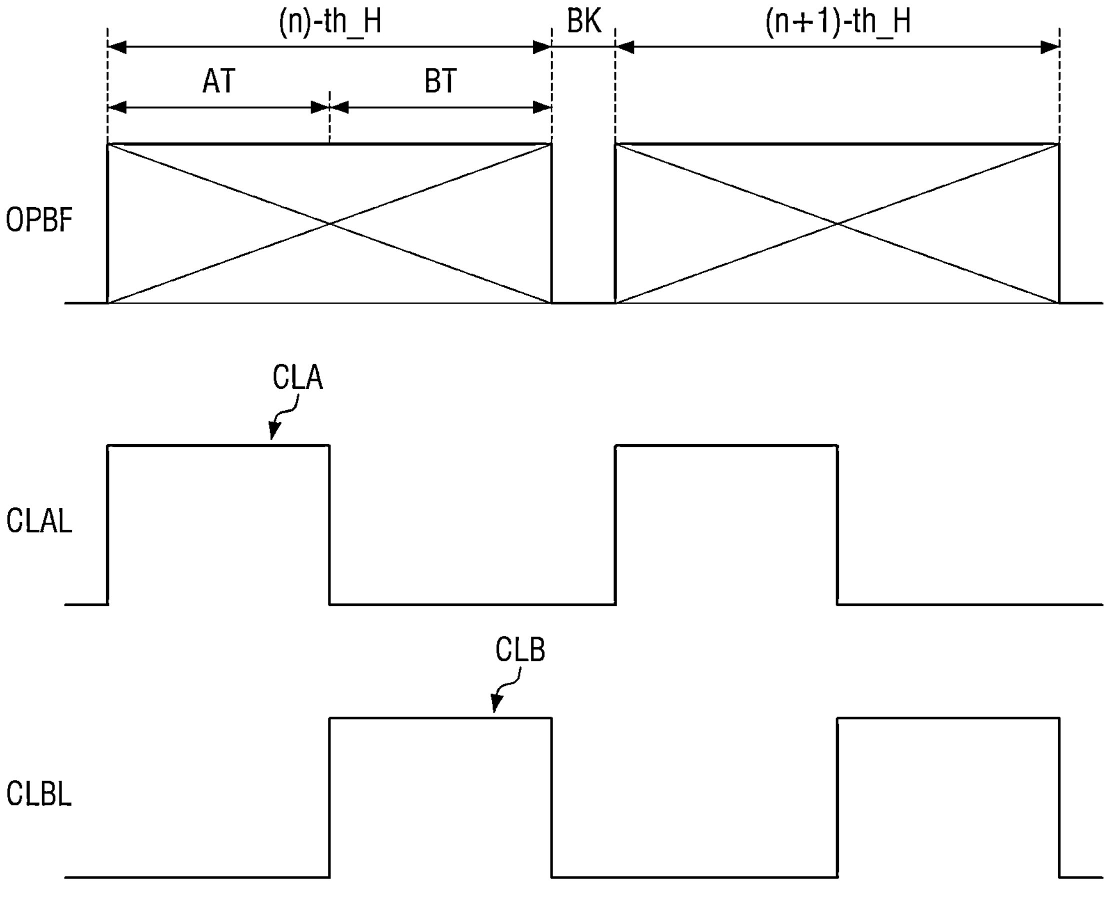
FIG. 10 is a timing diagram illustrating a first demultiplexer control signal and a second demultiplexer control signal illustrated in FIG. 9.

FIG. 10 is a timing diagram illustrating a first demultiplexer control signal and a second demultiplexer control signal illustrated in FIG. 9.

Referring to FIG. 9, the data driver 200 of the display device 100 according to embodiments may be disposed in the sub-area SBA of the substrate 110.

The data driver 200 may be disposed in the second sub-area SB2 of the sub-area SBA. Accordingly, in case that the bending area BA of the sub-area SBA is transformed into the bent shape, the data driver 200 may be disposed on a rear surface of the substrate 110 together with the second sub-area SB2 to overlap the main area MA of the substrate 110.

The data lines DL of the circuit layer 120 of the display device 100 according to embodiments may include first data lines DL1 disposed in the adjacent area ADJA and second data lines DL2 disposed in the spaced area DSTA.

The first data lines DL1 may be disposed more adjacent to the sub-area SBA than the second data lines DL2.

As an example, the first data lines DL1 may face the sub-area SBA in the second direction DR2 or may be adjacent to the sub-area SBA within a threshold distance. The second data lines DL2 may be adjacent to the non-display area NDA in the first direction DR1.

As described above, as the first data lines DL1 are disposed adjacent to the sub-area SBA, paths through which data signals are transferred to the first data lines DL1 (hereinafter referred to as "transfer paths") may be shorter than a first extension length.

On the other hand, as the second data lines DL2 are farther spaced apart from the sub-area SBA than the first data lines DL1 are, transfer paths of data signals of the second data lines DL2 may be longer than or equal to the first extension length.

For example, the data signals of the second data lines DL2 may be supplied through relatively long transfer paths longer than or equal to the first extension length compared to the data signals of the first data lines DL1. For this reason, the data signals of the second data lines DL2 may be easily distorted due to a delay, a voltage drop, or the like, compared to the data signals of the first data lines DL1.

As an example, the first extension length may be selected as one of an intermediate value and an average value of transfer paths of the data lines DL. As another example, the first extension length may be selected as a threshold value at which a difference between the data signal at a point in time in case that it reaches the data line DL and the data signal at a point time in case that it is output from an output buffer of the data driver 200 affects luminance.

The display device 100 according to embodiments may include a demultiplexer circuit DMC classifying transfer paths between the data driver 200 and the data lines DL according to extension lengths in order to more easily compensate for the transfer path longer than or equal to the first extension length.

According to embodiments, the demultiplexer circuit DMC may be disposed in the sub-area SBA of the substrate 110 together with the data driver 200.

As an example, the demultiplexer circuit DMC may be disposed in the second sub-area SBA of the sub-areas SBA. For example, the demultiplexer circuit DMC may be disposed between the data driver 200 and the bending area BA.

For example, the display device 100 according to embodiments may further include the demultiplexer circuit DMC electrically connected between the data driver 200 and the data lines DL of the circuit layer 120.

According to embodiments, the demultiplexer circuit DMC may include first demultiplexer transistors DXT1 turned on by a first demultiplexer control signal CLA (FIG. 10) of a first demultiplexer control line CLAL and second demultiplexer transistors DXT2 turned on by a second demultiplexer control signal CLB (FIG. 10) of a second demultiplexer control line CLBL.

The first data lines DL1 may be electrically connected to the data driver 200 through the first demultiplexer transistors DXT1 of the demultiplexer circuit DMC and the transfer paths shorter than the first extension length.

The second data lines DL2 may be electrically connected to the data driver 200 through the second demultiplexer transistors DXT2 of the demultiplexer circuit DMC and the transfer paths longer than or equal to the first extension length.

According to embodiments, the circuit layer 120 may further include data supply lines DSPL extending from the sub-area SBA to the display area DA and electrically connected between the data lines DL and the demultiplexer circuit DMC.

The transfer paths of the first data lines DL1 may include first data supply lines DSPL1 electrically connected between the first demultiplexer transistors DXT1 and the first data lines DL1 among the data supply lines DSPL.

As an example, the first data supply line DSPL1 may include a first data output line DOPL1 extending from the first demultiplexer transistor DXT1 of the demultiplexer circuit DMC to the bending area BA, a first data bending line DBDL1 extending from the first data output line DOPL1 to the first sub-area SB1, and a first data extension line DEXL1 extending from the first data bending line DBDL1 to the first data line DL1. For example, the first data output line DOPL1 may be disposed in the second sub-area SB2, the first data bending line DBDL1 may be disposed in the bending area BA, and the first data extension line DEXL1 may be disposed in the first sub-area SB1 and the non-display area NDA.

As an example, the first data bending line DBDL1 may be disposed at the second source-drain conductive layer on the first planarization layer 125 or a third source-drain conductive layer on the second planarization layer 126.

The first data output line DOPL1 and the first data extension line DEXL1 may be disposed at the first gate conductive layer or the second gate conductive layer covered with the interlayer insulating layer 124.

The transfer paths of the second data lines DL2 may include second data supply lines DSPL2 electrically connected between the second demultiplexer transistors DXT2 and the second data lines DL2 among the data supply lines DSPL.

As an example, the second data supply line DSPL2 may include a second data output line DOPL2 extending from the second demultiplexer transistor DXT2 of the demultiplexer circuit DMC to the bending area BA, a second data bending line DBDL2 extending from the second data output line DOPL2 to the first sub-area SB1, and a second data extension line DEXL2 extending from the second data bending line DBDL2 to the second data line DL2. For example, the second data output line DOPL2 may be disposed in the second sub-area SB2, the second data bending line DBDL2 may be disposed in the bending area BA, and the second data extension line DEXL2 may be disposed in the first sub-area SB1 and the non-display area NDA.

As an example, the second data bending line DBDL2 may be disposed at the second source-drain conductive layer on the first planarization layer 125 or a third source-drain conductive layer on the second planarization layer 126.

The second data output line DOPL2 and the second data extension line DEXL2 may be disposed at the first gate conductive layer or the second gate conductive layer covered with the interlayer insulating layer 124.

According to embodiments, the circuit layer 120 may further include a first power supply line VDSPL and second power supply lines VSSPL that are disposed in the non-display area NDA and transfer the first power ELVDD and the second power ELVSS, respectively.

Each of the first power supply line VDSPL and the second power supply lines VSSPL may extend from each of the signal pads SPD of the second sub-area SB2 to the non-display area NDA.

The data driver 200 may supply the first demultiplexer control signal CLA and the second demultiplexer control signal CLB to the first demultiplexer control line CLAL and the second demultiplexer control line CLBL, respectively.

Referring to FIG. 10, output buffers OPBF of the data driver 200 may output data signals of the emission pixel drivers EPD during each image frame period (n)-th_H and (n+1)-th_H (here, n is a natural number of 1 or more). BK is an interval between each image frame period (n)-th_H and (n+1)-th_H.

The first demultiplexer control signal CLA may be supplied during a first period AT of each image frame period (n)-th_H and (n+1)-th_H. The second demultiplexer control signal CLB may be supplied during a second period BT after the first period AT of each image frame period (n)-th_H and (n+1)-th_H.

For example, the data signal of the first data line DL1 may be transferred to the first data supply line DSPL1 during the first period AT of each image frame period (n)-th_H and (n+1)-th_H through the first demultiplexer transistor DXT1 turned on by the first demultiplexer control signal CLA.

The data signal of the second data line DL2 may be transferred to the second data supply line DSPL2 during the second period BT after the first period AT of each image frame period (n)-th_H and (n+1)-th_H through the second demultiplexer transistor DXT2 turned on by the second demultiplexer control signal CLB.

Accordingly, the data driver 200 may output the data signal of the first data line DL1 during the first period AT, and output the data signal of the second data line DL2 transferred through the transfer path longer than or equal to than the first extension length during the second period BT after the first period AT.

For example, according to embodiments, the data driver 200 outputs the data signal of the first data line DL1 and the data signal of the second data line DL2 at different times.

Therefore, the data driver 200 may output the data signal of the second data line DL2 to which a compensation value corresponding to the first extension length is applied during the second period BT, based on the data control signal DCS of the timing controller 500.

For example, the data signal of the second data line DL2 may include the compensation value corresponding to the first extension length, unlike the data signal of the first data line DL1.

According to embodiments, the compensation value may be applied to an increase in voltage level for each grayscale of the data signal, extension of an output period of the data signal, or the like according to the data control signal DCS of the timing controller 500.

In this case, even though the data driver 200 does not separately include a compensation circuit related to a transfer path of a relatively long extension length, the compensation value corresponding to the first extension length may be applied to the data signal of the second data line DL2 transferred through the transfer path longer than or equal to the first extension length.

Accordingly, it is possible to prevent display quality from being deteriorated due to distortion of the data signal caused by the relatively long transfer path without changing the data driver 200. Therefore, it may be advantageous in increasing resolution or a size of the display device 100 without being disadvantageous in slimming of the display device 100 and reducing a manufacturing cost of the display device 100.

FIG. 10 illustrates that the second period BT is disposed immediately after the first period AT, but this is only an example. For example, a waiting period may be further disposed between the first period AT and the second period BT.

Figure 11:
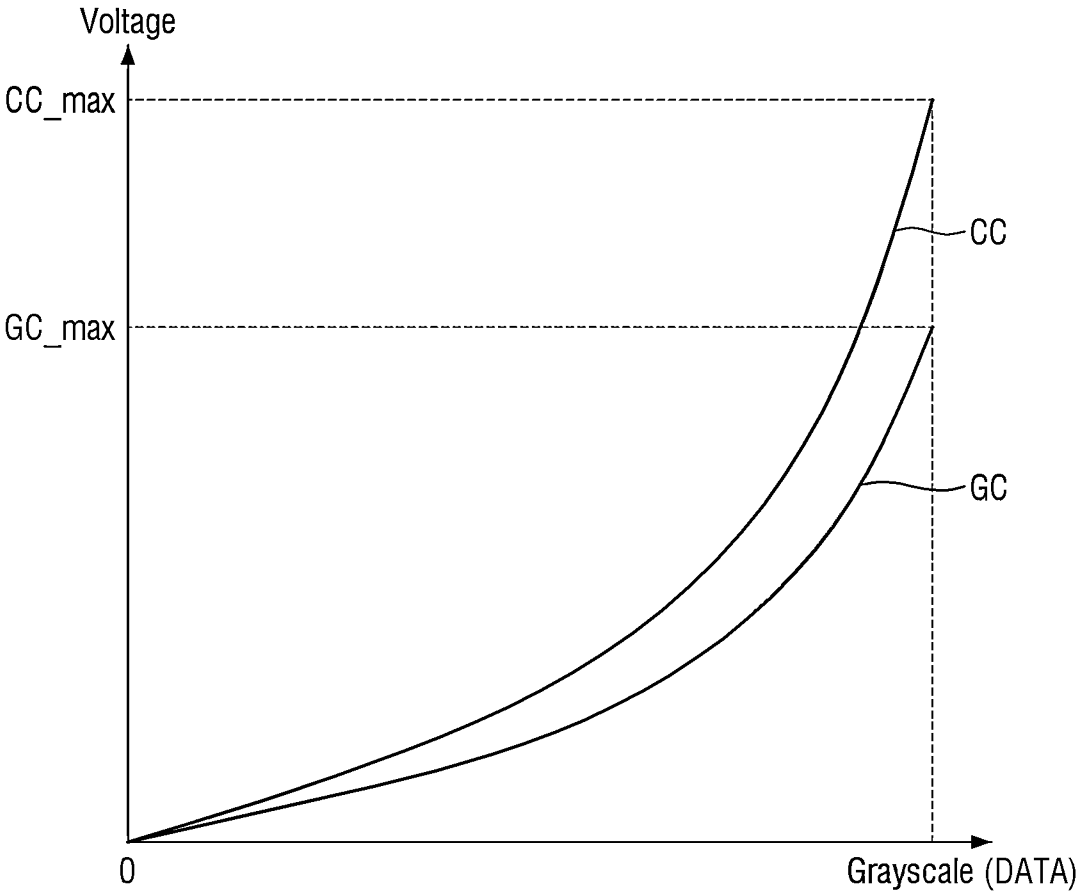
FIG. 11 is a diagram illustrating an example in which a compensation value according to embodiments is applied as a gamma curve.

FIG. 11 is a diagram illustrating an example in which a compensation value according to embodiments is applied as a gamma curve.

Referring to FIG. 11, the data driver 200 according to embodiments may generate the data signal of the first data line DL1 based on a general gamma curve GC. On the other hand, the data driver 200 may be based on a compensation gamma curve CC of which a gradient and a voltage level of the highest grayscale are higher than those of the general gamma curve in case that generating the data signal of the second data line DL2.

A voltage level CC_max of the highest grayscale according to the compensation gamma curve CC is higher than a voltage level GC_max of the highest grayscale according to the general gamma curve GC.

For example, the voltage level CC_max of the highest grayscale of the data signal of the second data line DL2 may be higher than the voltage level GC_max of the highest grayscale of the data signal of the first data line DL1 by the compensation value corresponding to the first extension length.

In this case, the distortion of the data signal of the second data line DL2 caused by the transfer path longer than or equal to the first extension length may be compensated for in advance, and thus, degradation of image quality due to the transfer path longer than or equal to the first extension length may be prevented.

Figure 12:
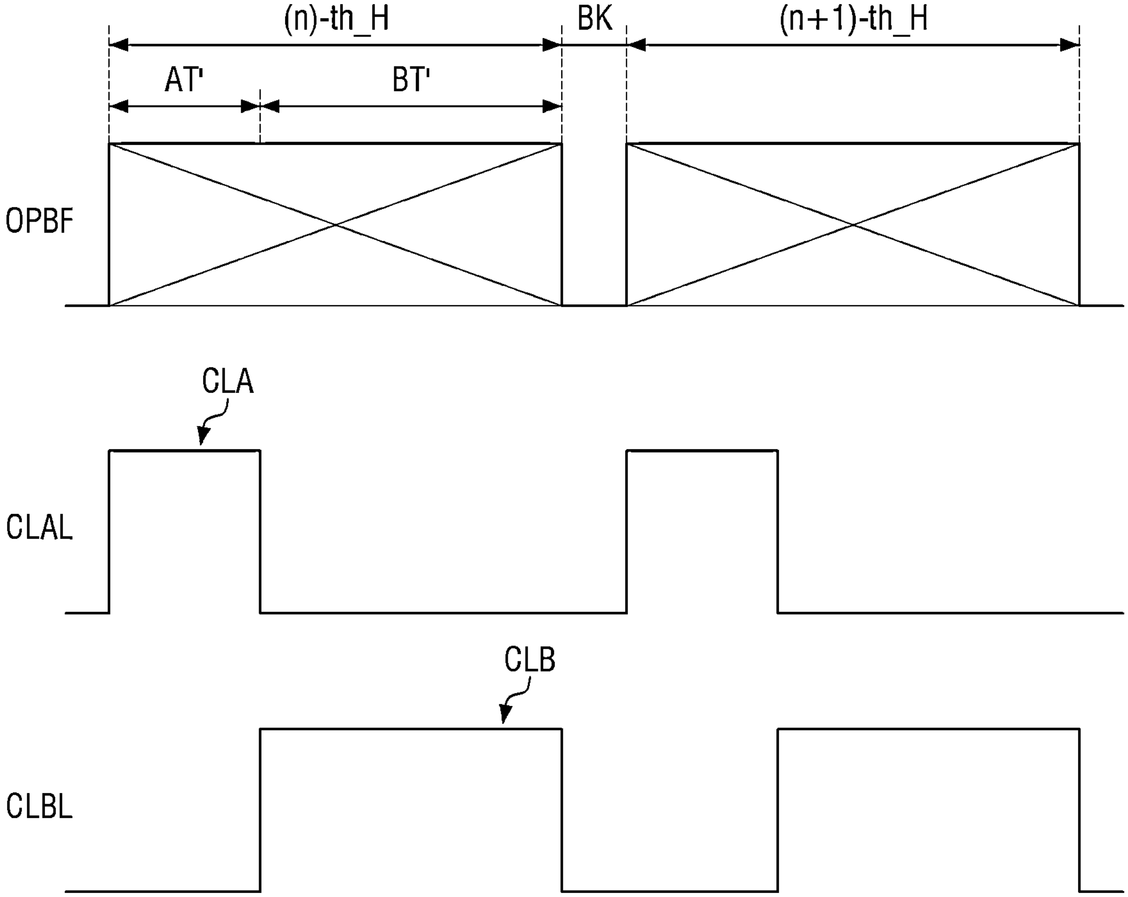
FIG. 12 is a diagram illustrating an example in which a compensation value according to embodiments is applied as a first period and a second period.

FIG. 12 is a diagram illustrating an example in which a compensation value according to embodiments is applied as a first period and a second period.

Referring to FIG. 12, the data driver 200 according to embodiments may adjust a length of a second period BT' during which the data signal of the second data line DL2 transferred through the transfer path longer than or equal to the first extension length is output so as to be longer than a length of a first period AT' during which the data signal of the first data line DL1 is output, according to the data control signal DCS of the timing controller 500.

In this case, even though the data signal of the second data line DL2 is delayed compared to the data signal of the first data line DL1 due to the transfer path longer than or equal to the first extension length, the supply of the data signal is maintained during the second period BT' having a relatively longer length, and thus, distortion of the data signal of the second data line DL2 may be reduced.

FIG. 9 illustrates a case where the demultiplexer circuit DMC includes two demultiplexer transistors DXT1 and DXT2. However, this is only an example, and the demultiplexer circuit DMC may also include three or more demultiplexer transistors.

Figure 13:
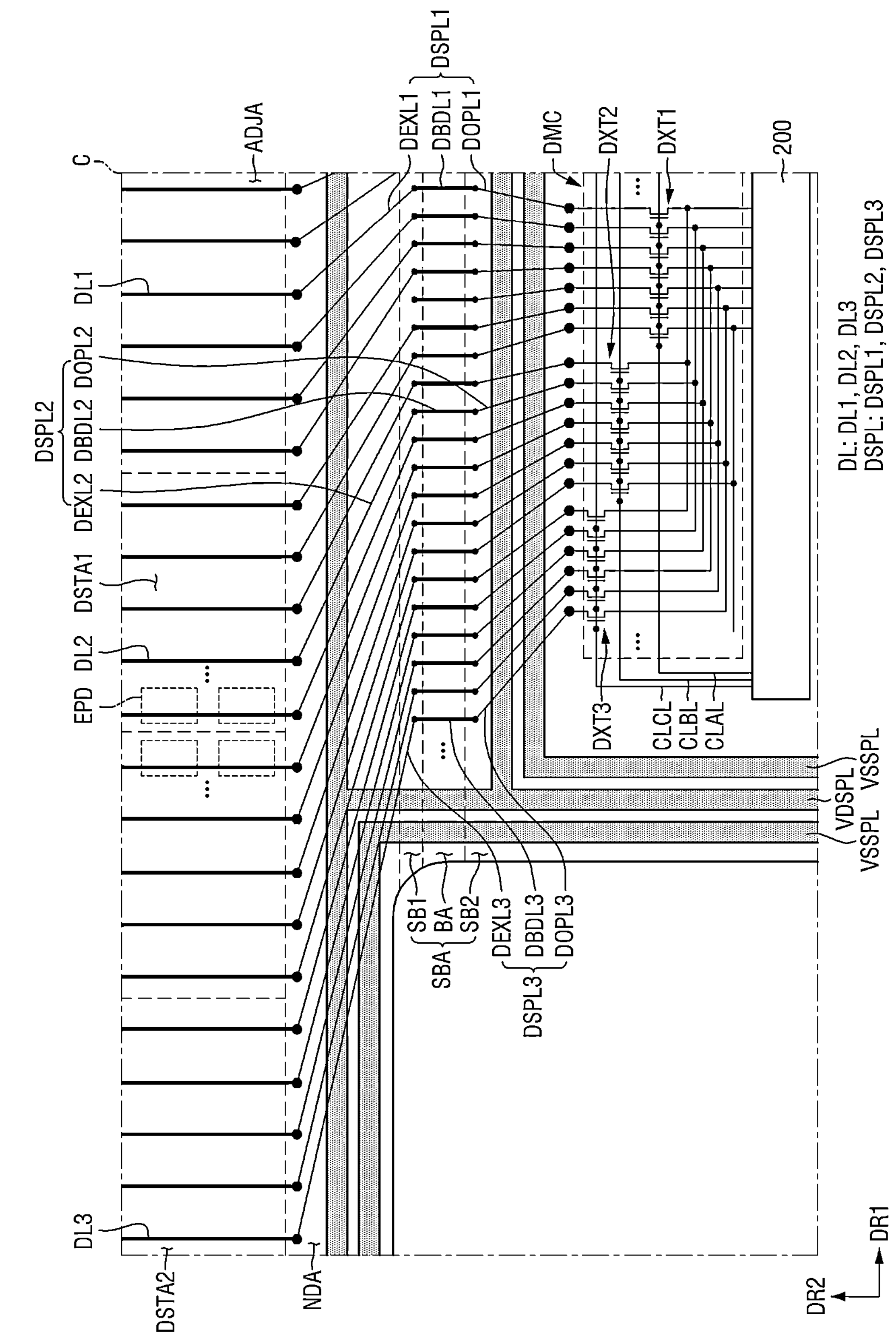
FIG. 13 is a plan diagram illustrating portion C of FIG. 8 according to an embodiment.
Figure 14:
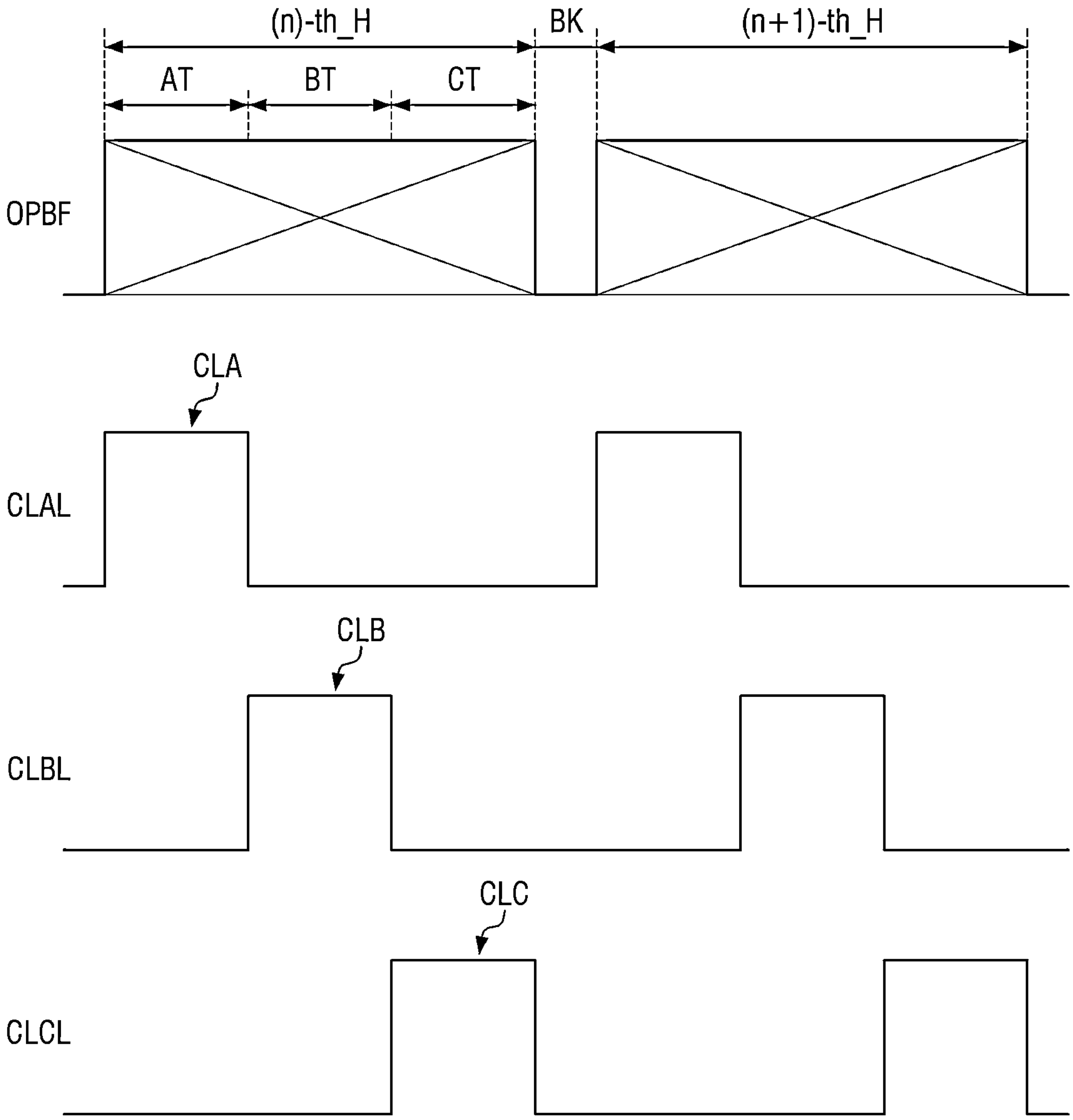
FIG. 14 is a timing diagram illustrating a first demultiplexer control signal, a second demultiplexer control signal, and a third demultiplexer control signal illustrated in FIG. 13.

FIG. 13 is a plan diagram illustrating portion C of FIG. 8 according to an embodiment. FIG. 14 is a timing diagram illustrating a first demultiplexer control signal, a second demultiplexer control signal, and a third demultiplexer control signal illustrated in FIG. 13.

Referring to FIG. 13, a display device 100 according to an embodiment is substantially the same as the display device 100 according to embodiments illustrated in FIGS. 1 to 12 except that the demultiplexer circuit DMC further includes third demultiplexer transistors DXT3 and that the data lines DL of the circuit layer 120 further include third data lines DL3, and thus, an overlapping description will hereinafter be omitted.

According to an embodiment, the display area DA of the substrate 110 may include an adjacent area ADJA facing at least a portion of the sub-area SBA in the second direction DR2 and a first spaced area DSTA1 and a second spaced area DSTA2 disposed between the adjacent area ADJA and the non-display area NDA in the first direction DR1.

The adjacent area ADJA may face a central portion of the sub-area SBA in the first direction DR1.

The first spaced area DSTA1 may be disposed between the adjacent area ADJA and the second spaced area DSTA2. The first spaced area DSTA1 may face one side or a side portion of the sub-area SBA in the first direction DR1.

The second spaced area DSTA2 may be disposed between the first spaced area DSTA1 and the non-display area NDA. The second spaced area DSTA2 may be disposed adjacent to a bent edge of the substrate 110.

According to an embodiment, the data lines DL of the circuit layer 120 may include first data lines DL1 disposed in the adjacent area ADJA, second data lines DL2 disposed in the first spaced area DSTA1, and third data lines DL3 disposed in the second spaced area DSTA3.

The first data lines DL1 of the first data lines DL1, the second data lines DL2, and the third data lines DL3 may be disposed most adjacent to the central portion of the sub-area SBA in the first direction DR1, and the third data lines DL3 of the first data lines DL1, the second data lines DL2, and the third data lines DL3 may be farthest spaced apart from the sub-area SBA and be disposed most adjacent to the non-display area NDA in the first direction DR1.

Accordingly, transfer paths of the first data lines DL1 may be shorter than a first extension length. Transfer paths of the second data lines DL2 may be longer than or equal to the first extension length and shorter than a second extension length. Transfer paths of the third data lines DL3 may be longer than or equal to the second extension length.

According to an embodiment, in order to differently perform compensation for the transfer paths shorter than the second extension length and compensation for the transfer paths longer than or equal to the second extension length, the demultiplexer circuit DMC may further include the third demultiplexer transistors DXT3 turned on by a third demultiplexer control signal CLC (see FIG. 14) of a third demultiplexer control line CLCL as well as the first demultiplexer transistors DXT1 and the second demultiplexer transistors DXT2.

According to an embodiment, the first data lines DL1 may be electrically connected to the data driver 200 through the first demultiplexer transistors DXT1 of the demultiplexer circuit DMC and the transfer paths shorter than the first extension length.

The second data lines DL2 may be electrically connected to the data driver 200 through the second demultiplexer transistors DXT2 of the demultiplexer circuit DMC and the transfer paths longer than or equal to the first extension length and shorter than the second extension length.

The third data lines DL3 may be electrically connected to the data driver 200 through the third demultiplexer transistors DXT3 of the demultiplexer circuit DMC and the transfer paths longer than or equal to the second extension length.

The transfer paths of the third data lines DL3 may include third data supply lines DSPL3 electrically connected between the third demultiplexer transistors DXT3 and the third data lines DL3 among the data supply lines DSPL.

As an example, the third data supply line DSPL3 may include a third data output line DOPL3 extending from the third demultiplexer transistor DXT3 of the demultiplexer circuit DMC to the bending area BA, a third data bending line DBDL3 extending from the third data output line DOPL3 to the first sub-area SB1, and a third data extension line DEXL3 extending from the third data bending line DBDL3 to the third data line DL3. For example, the third data output line DOPL3 may be disposed in the second sub-area SB2, the third data bending line DBDL3 may be disposed in the bending area BA, and the third data extension line DEXL3 may be disposed in the first sub-area SB1 and the non-display area NDA.

As an example, the third data bending line DBDL3 may be disposed at the second source-drain conductive layer on the first planarization layer 125 or a third source-drain conductive layer on the second planarization layer 126.

The third data output line DOPL3 and the third data extension line DEXL3 may be disposed at the first gate conductive layer or the second gate conductive layer covered with the interlayer insulating layer 124.

Referring to FIG. 14, the third demultiplexer control signal CLC may be supplied during a third period CT after the second period BT of each image frame period (n)-th_H and (n+1)-th_H.

Accordingly, the data signal of the third data line DL3 may be transferred to the third data supply line DSPL3 during the third period CT after the second period BT of each image frame period (n)-th_H and (n+1)-th_H through the third demultiplexer transistor DXT3 turned on by the third demultiplexer control signal CLC.

Therefore, the data driver 200 may output the data signal of the third data line DL3 to which a compensation value corresponding to the second extension length is applied during the third period CT, based on the data control signal DCS of the timing controller 500.

The compensation value may be applied to an increase in voltage level for each grayscale of the data signal, extension of an output period of the data signal, or the like according to the data control signal DCS of the timing controller 500.

Figure 15:
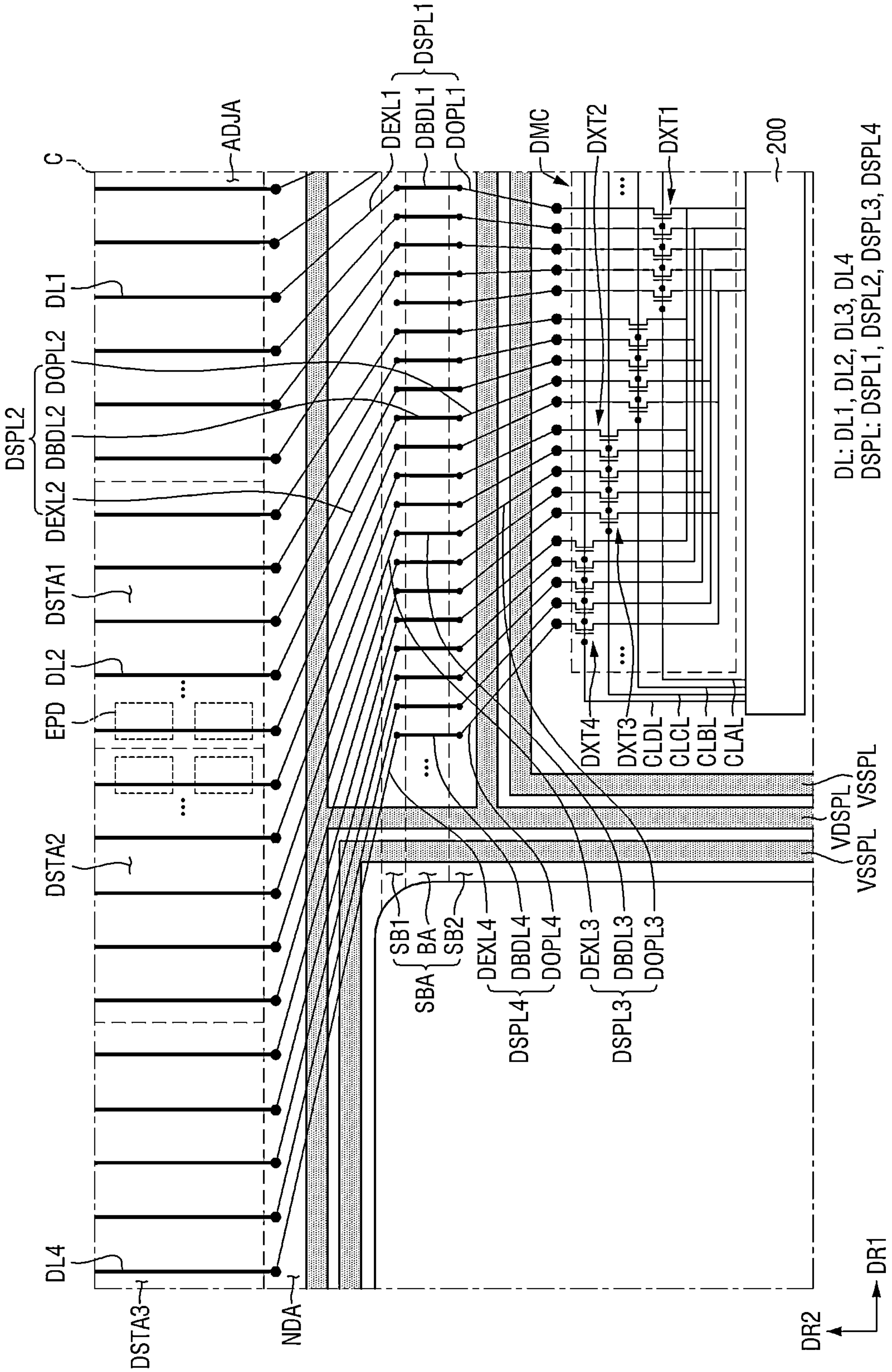
FIG. 15 is a plan diagram illustrating portion C of FIG. 8 according to an embodiment.
Figure 16:
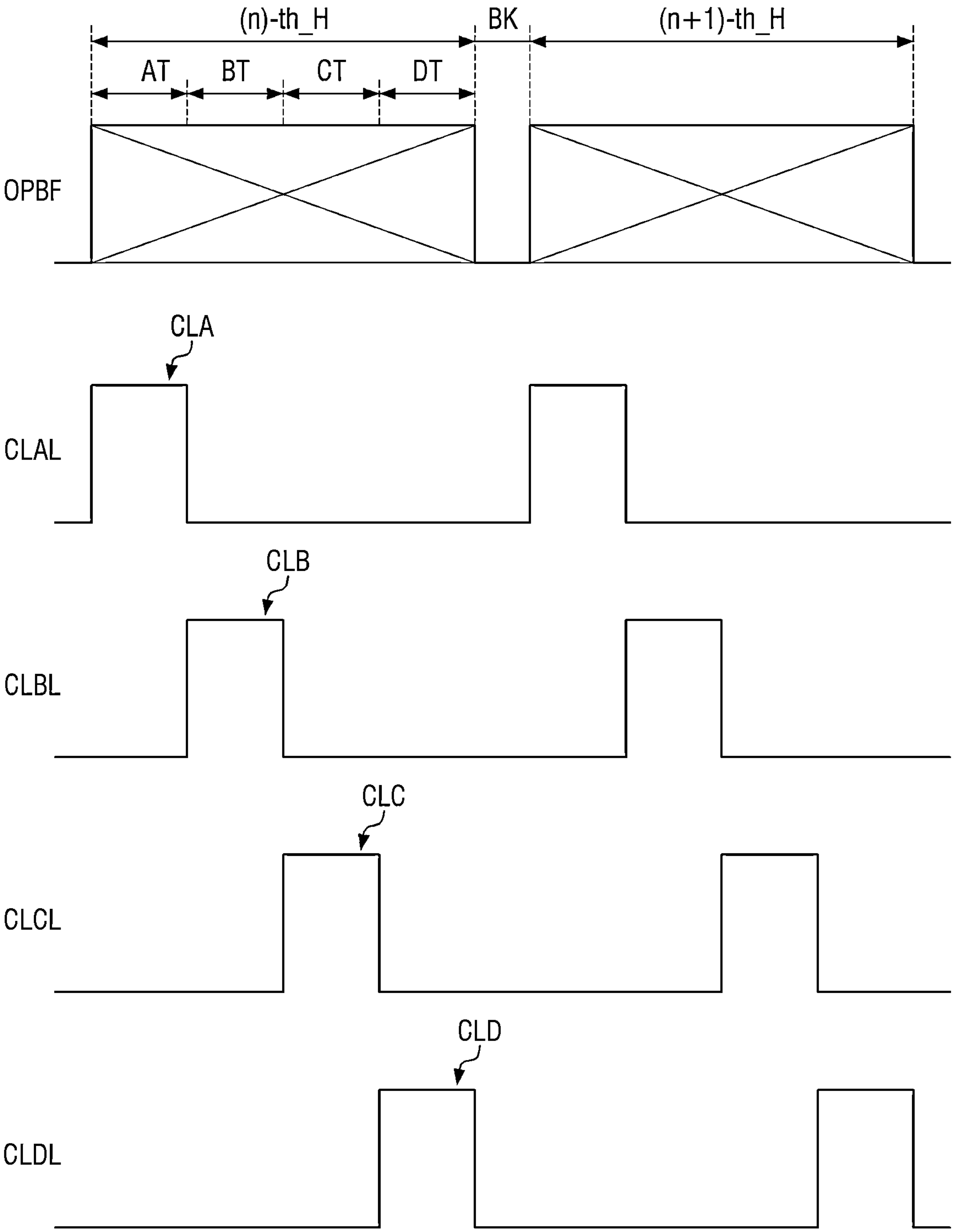
FIG. 16 is a timing diagram illustrating a first demultiplexer control signal, a second demultiplexer control signal, a third demultiplexer control signal, and a fourth demultiplexer control signal illustrated in FIG. 15.

FIG. 15 is a plan diagram illustrating portion C of FIG. 8 according to an embodiment. FIG. 16 is a timing diagram illustrating a first demultiplexer control signal, a second demultiplexer control signal, a third demultiplexer control signal, and a fourth demultiplexer control signal illustrated in FIG. 15.

Referring to FIG. 15, a display device 100 according to an embodiment is substantially the same as the display device 100 according to an embodiment illustrated in FIG. 14 except that the demultiplexer circuit DMC further includes fourth demultiplexer transistors DXT4 and that the data lines DL of the circuit layer 120 further include fourth data lines DLA, and thus, an overlapping description will hereinafter be omitted.

According to an embodiment, the display area DA of the substrate 110 may further include a third spaced area DSTA3 disposed between the second spaced area DSTA2 and the non-display area NDA.

The second spaced area DSTA2 may be disposed between the first spaced area DSTA1 and the third spaced area DSTA3.

The third spaced area DSTA3 may be disposed more adjacent to a bent edge of the substrate 110 than the second spaced area DSTA2 is.

According to an embodiment, the data lines DL of the circuit layer 120 may further include the fourth data lines DLA disposed in the third spaced area DSTA3.

The fourth data lines DL4 of the first data lines DL1, the second data lines DL2, the third data lines DL3, and the fourth data lines DLA may be farthest spaced apart from the sub-area SBA and be disposed most adjacent to the non-display area NDA in the first direction DR1.

Accordingly, transfer paths of the third data line DL3 may be longer than or equal to the second extension length and shorter than a third extension length. Transfer paths of the fourth data lines DL4 may be longer than or equal to the third extension length.

According to an embodiment, in order to differently perform compensation for the transfer paths shorter than the third extension length and compensation for the transfer paths longer than or equal to the third extension length, the demultiplexer circuit DMC may further include the fourth demultiplexer transistors DXT4 turned on by a fourth demultiplexer control signal CLD (see FIG. 16) of a fourth demultiplexer control line CLDL.

The third data lines DL3 may be electrically connected to the data driver 200 through the third demultiplexer transistors DXT3 of the demultiplexer circuit DMC and the transfer paths longer than or equal to the second extension length and shorter than the third extension length.

The fourth data lines DL4 may be electrically connected to the data driver 200 through the fourth demultiplexer transistors DXT4 of the demultiplexer circuit DMC and the transfer paths longer than or equal to the third extension length.

The transfer paths of the fourth data lines DL4 may include fourth data supply lines DSPL4 electrically connected between the fourth demultiplexer transistors DXT4 and the fourth data lines DL4 among the data supply lines DSPL.

As an example, the fourth data supply line DSPL3 may include a fourth data output line DOPL4 extending from the fourth demultiplexer transistor DXT4 of the demultiplexer circuit DMC to the bending area BA, a fourth data bending line DBDL4 extending from the fourth data output line DOPL4 to the first sub-area SB1, and a fourth data extension line DEXL4 extending from the fourth data bending line DBDL4 to the fourth data line DL4. For example, the fourth data output line DOPL4 may be disposed in the second sub-area SB2, the fourth data bending line DBDL4 may be disposed in the bending area BA, and the fourth data extension line DEXL4 may be disposed in the first sub-area SB1 and the non-display area NDA.

As an example, the fourth data bending line DBDL4 may be disposed at the second source-drain conductive layer on the first planarization layer 125 or a third source-drain conductive layer on the second planarization layer 126.

The fourth data output line DOPL4 and the fourth data extension line DEXL4 may be disposed at the first gate conductive layer or the second gate conductive layer covered with the interlayer insulating layer 124.

Referring to FIG. 16, the fourth demultiplexer control signal CLD may be supplied during a fourth period DT after the third period CT of each image frame period (n)-th_H and (n+1)-th_H.

Accordingly, the data signal of the fourth data line DL4 may be transferred to the fourth data supply line DSPL4 during the fourth period DT after the third period CT of each image frame period (n)-th_H and (n+1)-th_H through the fourth demultiplexer transistor DXT4 turned on by the fourth demultiplexer control signal CLD.

Therefore, the data driver 200 may output the data signal of the fourth data line DL4 to which a compensation value corresponding to the third extension length is applied during the fourth period DT, based on the data control signal DCS of the timing controller 500.

The compensation value may be applied to an increase in voltage level for each grayscale of the data signal, extension of an output period of the data signal, or the like according to the data control signal DCS of the timing controller 500.

As the number of data lines DL increases due to an increase in resolution or size, the number of data supply lines DSPL disposed in the non-display area NDA also increases, and thus, there may be a limitation in reducing a width of the non-display area NDA.

An embodiment below provides a display device 100 capable of reducing a width of a non-display area NDA.

Figure 17:
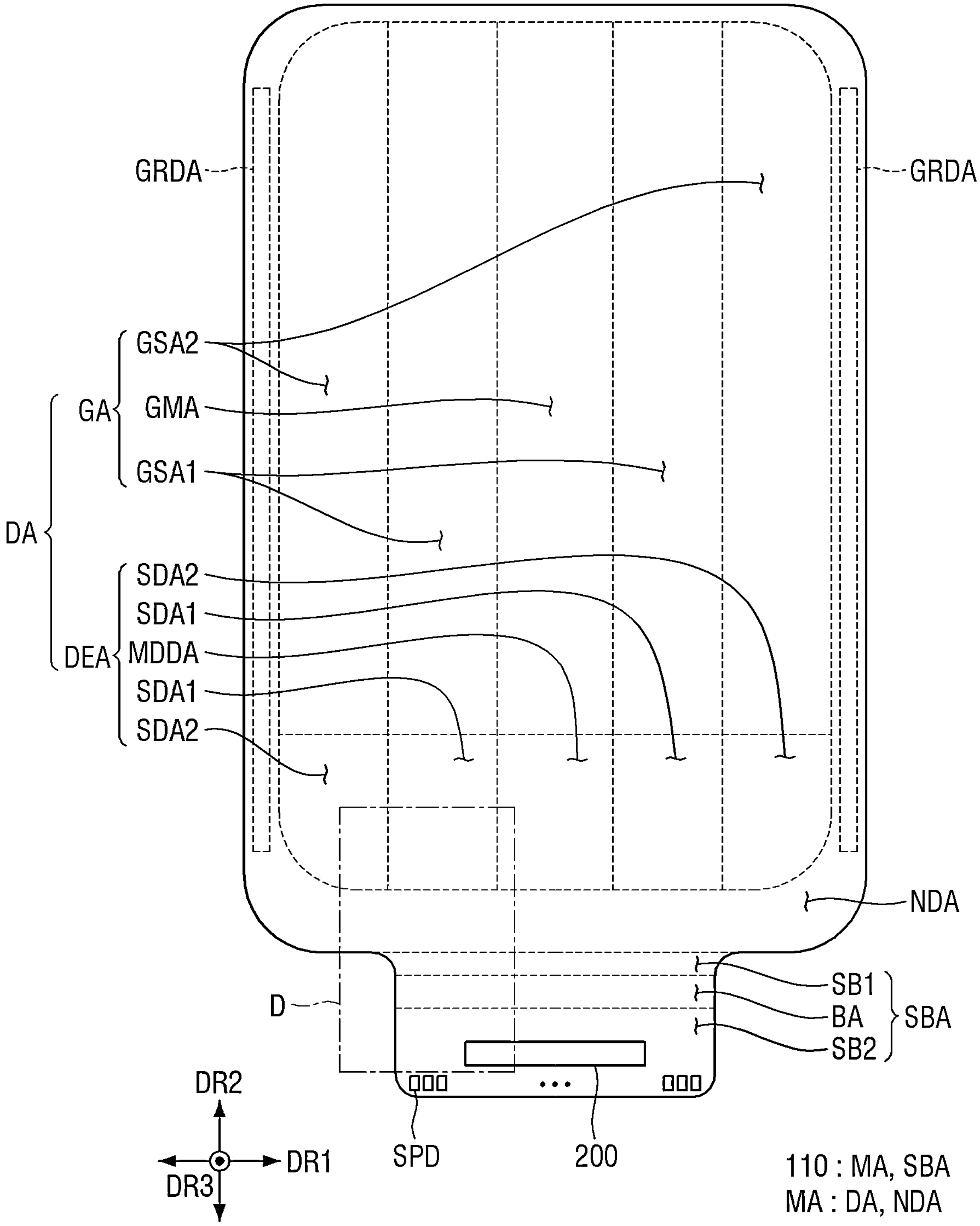
FIG. 17 is a schematic plan view illustrating a substrate of FIG. 2 according to an embodiment.
Figure 18:
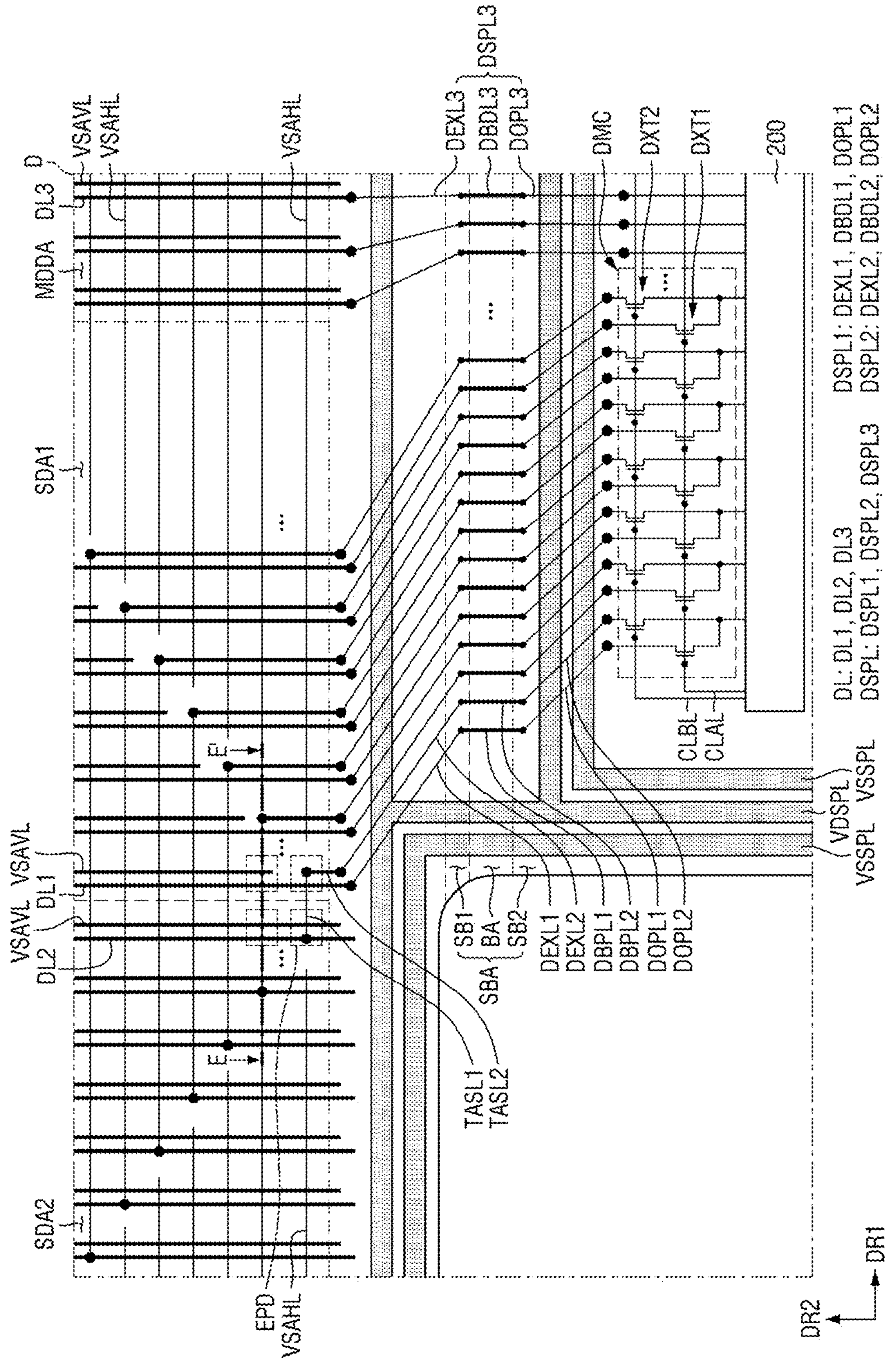
FIG. 18 is a plan diagram illustrating portion D of FIG. 17.
Figure 19:
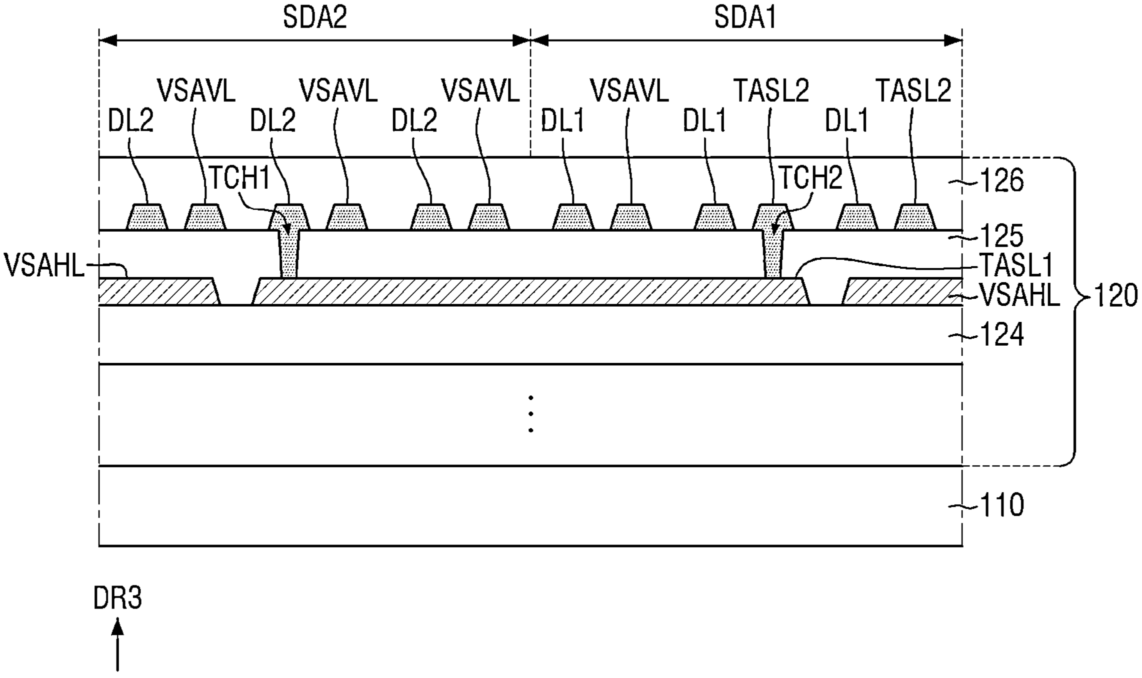
FIG. 19 is a schematic cross-sectional view taken along line E-E' of FIG. 18.

FIG. 17 is a schematic plan view illustrating a substrate of FIG. 2 according to an embodiment. FIG. 18 is a plan diagram illustrating portion D of FIG. 17. FIG. 19 is a schematic cross-sectional view taken along line E-E' of FIG. 18.

Referring to FIG. 17, a display area DA of a substrate 110 of a display device 100 according to an embodiment is substantially the same as that of the substrate according to embodiments illustrated in FIG. 8 except that it includes a bypass area DEA disposed on one side or a side adjacent to the sub-area SBA and a general area GA disposed in an area other than the bypass area DEA, and thus, an overlapping description will hereinafter be omitted.

According to an embodiment, the bypass area DEA disposed on one side or a side of the display area DA in the second direction DR2 so as to be adjacent to the sub-area SBA may include a bypass middle area MDDA disposed in the middle in the first direction DR1 and first bypass side areas SDA1 and second bypass side areas SDA2 disposed between the bypass middle area MDDA and the non-display area NDA in the first direction DR1.

The first bypass side area SDA1 may be in contact with one side or a side of the bypass middle area MDDA and may be disposed between the bypass middle area MDDA and the second bypass side area SDA2.

The second bypass side area SDA2 may be in contact with the non-display area NDA and may be disposed between the first bypass side area SDA1 and the non-display area NDA.

The second bypass side area SDA2 may be disposed more adjacent to a bent edge of the substrate 110 than the bypass middle area MDDA and the first bypass side area SDA1 are.

The first bypass side areas SDA1 and the second bypass side areas SDA2 may be disposed between each of both sides of the bypass middle area MDDA in the first direction DR1 and the non-display area NDA.

The general area GA disposed between the bypass area DEA and the non-display area NDA in the second direction DR2 in the display area DA may include a general middle area GMA connected to the bypass middle area MDDA of the bypass area DEA in the second direction DR2, first general side areas GSA1 connected to the first side areas SDA1 of the bypass area DEA in the second direction DR2, and second general side areas GSA2 connected to the second side areas SDA2 of the bypass area DEA in the second direction DR2.

Referring to FIG. 18, a display device 100 according to an embodiment is substantially the same as the display device 100 according to embodiments illustrated in FIGS. 1 to 12 except that second data lines DL2 are electrically connected to second data supply lines DSPL2 through first bypass auxiliary lines TASL1 and second bypass auxiliary lines TASL2 disposed in the display area DA, and thus, an overlapping description will hereinafter be omitted.

According to an embodiment, the data lines DL may include first data lines DL1 disposed in the first bypass side area SDA1 and second data lines DL2 disposed in the second bypass side area SDA2.

For example, the first data lines DL1 of the first data lines DL1 and the second data lines DL2 may be disposed more adjacent to the sub-area SBA, and the second data lines DL2 of the first data lines DL1 and the second data lines DL2 may be disposed more adjacent to the non-display area NDA in the first direction DR1.

According to an embodiment, the data supply lines DSPL may extend to the bypass middle area MDDA and the first bypass side area SDA1 adjacent to the sub-area SBA.

For example, first data supply lines DSPL1 transferring data signals of the first data lines DL1 disposed in the first bypass side area SDA1 among the data supply lines DSPL may extend to the first bypass side area SDA1 and may be directly electrically connected to the first data lines DL1.

On the other hand, second data supply lines DSPL2 transferring data signals of the second data lines DL2 disposed in the second bypass side area SDA2 among the data supply lines DSPL may extend to the first bypass side area SDA1 rather than the second bypass side area SDA2. The second data supply lines DSPL2 may be electrically connected to the second data lines DL2 through the first bypass auxiliary lines TASL1 and the second bypass auxiliary lines TASL2 disposed in the bypass area DEA of the display area DA.

The first bypass auxiliary lines TASL1 may be disposed in the bypass area DEA of the display area DA, may extend in the first direction DR1 intersecting the data lines DL, and may be electrically connected to the second data lines DL2.

The second bypass auxiliary lines TASL2 may extend in the second direction DR2 in parallel with the data lines DL, may be paired with the first data lines DL1, and may be electrically connected between the first bypass auxiliary lines TASL1 and the second data supply lines DSPL2.

The second bypass auxiliary lines TASL2 are paired with the first data lines DL1, and thus, may be disposed in the first bypass side area SDA1 together with the first data lines DL1. Accordingly, the second data supply lines DSPL2 may extend to the first bypass side area SDA1 and may be electrically connected to the second bypass auxiliary lines TASL2.

As such, the second data supply lines DSPL2 are not directly electrically connected to the second data lines DL2, and thus, may not extend to the second bypass side area SDA2 adjacent to the bent edge of the substrate 110. Accordingly, extension lengths of the second data supply lines DSPL2 may be reduced, and thus, a width of the non-display area NDA may be reduced.

The first data lines DL1 may be electrically connected to the demultiplexer circuit DMC and the data driver 200 through the first data supply lines DSPL1. Accordingly, transfer paths of the data signals of the first data lines DL1 may be shorter than a first extension length.

In other words, the first data lines DL1 may be electrically connected to the data driver 200 through the first demultiplexer transistors DXT1 of the demultiplexer circuit DMC and the transfer paths shorter than the first extension length.

In contrast, the second data lines DL2 may be electrically connected to the demultiplexer circuit DMC and the data driver 200 through the first bypass auxiliary lines TASL1, the second bypass auxiliary lines TASL2, and the second data supply lines DSPL2. Accordingly, transfer paths of the data signals of the second data lines DL2 may be longer than or equal to the first extension length.

For example, the second data lines DL2 may be electrically connected to the data driver 200 through the second demultiplexer transistors DXT2 of the demultiplexer circuit DMC and the transfer paths longer than or equal to the first extension length.

The data lines DL may further include third data lines DL3 disposed in the bypass middle area MDDA.

Third data supply lines DSPL3 transferring data signals of the third data lines DL3 among the data supply lines DSPL may extend to the bypass middle area MDDA and may be directly electrically connected to the third data lines DL3.

As illustrated in FIG. 18, the third data supply lines DSPL3 may not be connected to the demultiplexer circuit DMC, and may be directly electrically connected to the data driver 200. However, this is only an example, and the third data supply lines DSPL3 may also be electrically connected to the demultiplexer circuit DMC.

As an example, the third data lines DL3 are directly electrically connected to the third data supply lines DSPL3, and thus, transfer paths of the data signals of the third data lines DL3 may be expected to be shorter than the first extension length. Accordingly, the third data supply lines DSPL3 may be electrically connected to the data driver 200 through the first demultiplexer transistors DXT1 of the demultiplexer circuit DMC, like the first data supply lines DSPL1.

According to an embodiment, the first bypass auxiliary lines TASL1 are disposed between the second data lines DL2 and the second bypass auxiliary lines TASL2, and the second bypass auxiliary lines TASL2 disposed between the first bypass auxiliary lines TASL1 and the second data supply lines DSPL2 while being paired with the first data lines DL1.

As such, the first bypass auxiliary lines TASL1 and the second bypass auxiliary lines TASL2 may be limitedly arranged (or disposed) in the bypass area DEA, and accordingly, ends of the first bypass auxiliary lines TASL1 and ends of the second bypass auxiliary lines TASL2 may be arranged (or disposed) with a selectable regularity. For this reason, visibility of the first bypass auxiliary lines TASL1 and the second bypass auxiliary lines TASL2 may be increased.

In order to prevent the increase in the visibility of the first bypass auxiliary lines TASL1 and the second bypass auxiliary lines TASL2, according to an embodiment, the circuit layer 120 may further include second power auxiliary horizontal lines VSAHL disposed in the general area GA and extending in the first direction DR1 and second power auxiliary vertical lines VSAVL extending in the second direction DR2 while being paired with each of the second data lines DL2 and the third data lines DL3, together with the first bypass auxiliary lines TASL1.

The second power auxiliary horizontal lines VSAHL and the second power auxiliary vertical lines VSAVL may be electrically connected to each other and be electrically connected to the second power supply lines VSSPL.

Two second power auxiliary horizontal lines VSAHL of the second power auxiliary horizontal lines VSAHL may extend from both ends of the first bypass auxiliary line TASL1 to the non-display area NDA.

One second power auxiliary vertical line VSAVL of the second power auxiliary vertical lines VSAVL may extend from one end or an end of the second bypass auxiliary line TASL2 to the non-display area NDA in a direction becoming distant from the sub-area SBA.

Referring to FIG. 19, the data lines DL and the second bypass auxiliary lines TASL2 may be disposed on at least one insulating layer covering the first bypass auxiliary line TASL1.

As an example, the data lines DL, the second bypass auxiliary lines TASL2, and the second power auxiliary vertical lines VSAVL may be disposed at the second source-drain conductive layer on the first planarization layer 125, and may be covered with the second planarization layer 126. The first bypass auxiliary line TASL1 and the second power auxiliary horizontal lines VSAHL may be disposed at the first source-drain conductive layer on the interlayer insulating layer 124 covered with the first planarization layer 125.

The first bypass auxiliary line TASL1 may be electrically connected to the second data line DL2 through a first bypass connection hole TCH1, and may be electrically connected to the second bypass auxiliary line TASL2 through a second bypass connection hole TCH2. Each of the first bypass connection hole TCH1 and the second bypass connection hole TCH2 may penetrate through the first planarization layer 125.

As described above, according to an embodiment, the second data lines DL2 may be electrically connected to the second data supply lines DSPL2 through the first bypass auxiliary lines TASL1 and the second bypass auxiliary lines TASL2. Accordingly, the second data supply lines DSPL2 extend to the first bypass side area SDA1, such that the extension lengths of the second data supply line DSPL2 may be reduced, and thus, the width of the non-display area NDA may be reduced.

According to an embodiment, the first data supply lines DSPL1 directly electrically connected to the first data lines DL1 may be electrically connected to the first demultiplexer transistors DXT1 of the demultiplexer circuit DMC. In contrast, the second data supply lines DSPL2 electrically connected to the second data lines DL2 through the first bypass auxiliary lines TASL1 and the second bypass auxiliary lines TASL2 may be electrically connected to the second demultiplexer transistors DXT2 of the demultiplexer circuit DMC.

The first demultiplexer transistor DXT1 may be turned on by the first demultiplexer signal CLA supplied during the first period AT of each image frame period (n)-th_H and (n+1)-th_H. The second demultiplexer transistor DXT2 may be turned on by the second demultiplexer signal CLB supplied during the second period BT after the first period AT of each image frame period (n)-th_H and (n+1)-th_H.

Accordingly, the data driver 200 may output the data signal of the first data line DL1 during the first period AT, and output the data signal of the second data line DL2 to which the compensation value corresponding to the first extension length is applied based on the data control signal DCS of the timing controller 500 during the second period BT.

For example, even though the data driver 200 does not separately include a compensation circuit related to a transfer path of a relatively long extension length, the compensation value corresponding to the first extension length may be applied to the data signal of the second data line DL2 transferred through the transfer path longer than or equal to the first extension length.

Accordingly, it is possible to prevent display quality from being deteriorated due to distortion of the data signal caused by the relatively long transfer path without changing the data driver 200. Therefore, it may be advantageous in increasing resolution or a size of the display device without being disadvantageous in slimming of the display device and reducing a manufacturing cost of the display device.

Embodiments have been described hereinabove with reference to the accompanying drawings, but it will be understood by one of ordinary skill in the art to which the disclosure pertains that various modifications and alterations may be made without departing from the technical spirit or essential features of the disclosure. Therefore, it is to be understood that the embodiments described above are illustrative rather than being restrictive in all aspects.

The effects of the disclosure are not restricted to the ones set forth herein. The above and other effects of the disclosure will become more apparent to one of ordinary skill in the art to which the disclosure pertains and by referencing the claims.

What is claimed is:

1. A display device comprising:
a main area including a display area in which emission areas are disposed and a non-display area disposed around the display area;
a sub-area protruding from a side of the main area;
a circuit layer disposed on a substrate, the circuit layer including emission pixel drivers electrically connected to light emitting elements of the emission areas, respectively, and data lines transferring data signals of the emission pixel drivers;
a data driver generating the data signals of the emission pixel drivers; and
a demultiplexer circuit electrically connected between the data driver and the data lines, the demultiplexer circuit including a first demultiplexer transistor turned on by a first demultiplexer control signal and a second demultiplexer transistor turned on by a second demultiplexer control signal, wherein
a first data line of the data lines is electrically connected to the data driver through the first demultiplexer transistor, the first data line including a transfer path shorter than a first extension length,
a second data line of the data lines is electrically connected to the data driver through the second demultiplexer transistor, the second data line including a transfer path longer than or equal to the first extension length, and
a data signal of the second data line includes a compensation value corresponding to the first extension length, wherein
the first demultiplexer control signal is supplied during a first period of each image frame period, and
the second demultiplexer control signal is supplied during a second period after the first period of each image frame period.

2. The display device of claim 1, wherein a voltage level of a highest grayscale of the data signal of the second data line is higher than a voltage level of a highest grayscale of a data signal of the first data line based on the compensation value.

3. The display device of claim 1, wherein the second period is longer than the first period based on the compensation value.

4. The display device of claim 1, wherein
the data driver and the demultiplexer circuit are disposed in the sub-area,
the first data line is more adjacent to the sub-area than the second data line,
the circuit layer further includes data supply lines extending from the sub-area to the display area and electrically connected between the data lines and the demultiplexer circuit,
the transfer path of the first data line includes a first data supply line electrically connected between the first demultiplexer transistor and the first data line among the data supply lines, and
the transfer path of the second data line includes a second data supply line electrically connected between the second demultiplexer transistor and the second data line among the data supply lines.

5. The display device of claim 4, wherein
the first data line is directly electrically connected to the first data supply line, and
the transfer path of the second data line further includes:
a first bypass auxiliary line disposed in the display area, extending in a first direction, and electrically connected to the second data line; and
a second bypass auxiliary line disposed in the display area, extending in a second direction together with the data lines, paired with the first data line, and electrically connected between the first bypass auxiliary line and the second data supply line.

6. The display device of claim 1, wherein
the demultiplexer circuit further includes a third demultiplexer transistor turned on by a third demultiplexer control signal supplied during a third period after the second period of each image frame period,
the second data line is electrically connected to the data driver through the second demultiplexer transistor and the second data line includes a transfer path longer than or equal to the first extension length and shorter than a second extension length, and a third data line of the data lines is electrically connected to the data driver through the third demultiplexer transistor and the third data line of the data lines includes a transfer path longer than or equal to the second extension length.

7. The display device of claim 6, wherein the demultiplexer circuit further includes a fourth demultiplexer transistor turned on by a fourth demultiplexer control signal supplied during a fourth period after the third period of each image frame period, the third data line is electrically connected to the data driver through the third demultiplexer transistor and the third data line includes a transfer path longer than or equal to the second extension length and shorter than a third extension length, and a fourth data line of the data lines is electrically connected to the data driver through the fourth demultiplexer transistor and the fourth data line of the data lines includes a transfer path longer than or equal to the third extension length.

8. A display device comprising:

a main area including a display area in which emission areas are disposed and a non-display area disposed around the display area;

a sub-area protruding from a side of the main area;

a circuit layer disposed on a substrate, the circuit layer including emission pixel drivers electrically connected to light emitting elements of the emission areas, respectively, and data lines transferring data signals of the emission pixel drivers;

a data driver generating the data signals of the emission pixel drivers; and a demultiplexer circuit electrically connected between the data driver and the data lines, wherein a transfer path between a first data line of the data lines and the demultiplexer circuit is shorter than a first extension length, a transfer path between a second data line of the data lines and the demultiplexer circuit is longer than or equal to a second extension length, and the demultiplexer circuit outputs a data signal of the first data line during a first period of each image frame period and outputs a data signal of the second data line during a second period after the first period of each image frame period, and the data signal of the second data line includes a compensation value corresponding to the first extension length.

9. The display device of claim 8, wherein the data driver and the demultiplexer circuit are disposed in the sub-area, the first data line is more adjacent to the sub-area than the second data line, the circuit layer further includes data supply lines extending from the sub-area to the display area and electrically connected between the data lines and the demultiplexer circuit, the transfer path between the first data line and the demultiplexer circuit includes a first data supply line electrically connected between the demultiplexer circuit and the first data line among the data supply lines, and the transfer path between the second data line and the demultiplexer circuit includes a second data supply line electrically connected between the demultiplexer circuit and the second data line among the data supply lines.

10. The display device of claim 9, wherein the first data line is directly electrically connected to the first data supply line, and the transfer path between the second data line and the demultiplexer circuit further includes:

a first bypass auxiliary line disposed in the display area, extending in a first direction, and electrically connected to the second data line; and a second bypass auxiliary line disposed in the display area, extending in a second direction together with the data lines, paired with the first data line, and electrically connected between the first bypass auxiliary line and the second data supply line.

11. The display device of claim 9, wherein the demultiplexer circuit includes:

a first demultiplexer transistor turned on by a first demultiplexer control signal during the first period of each image frame period and electrically connected between the data driver and the first data supply line; and a second demultiplexer transistor turned on by a second demultiplexer control signal during the second period of each image frame period and electrically connected between the data driver and the second data supply line.

12. The display device of claim 9, wherein the transfer path between the second data line and the demultiplexer circuit is longer than or equal to the first extension length and shorter than the second extension length, a transfer path between a third data line of the data lines and the demultiplexer circuit is longer than or equal to the second extension length, and the demultiplexer circuit outputs a data signal of the third data line during a third period after the second period of each image frame period.

13. The display device of claim 12, wherein the transfer path between the third data line and the demultiplexer circuit is longer than or equal to the second extension length and shorter than a third extension length, a transfer path between a fourth data line of the data lines and the demultiplexer circuit is longer than or equal to the third extension length, and the demultiplexer circuit outputs a data signal of the fourth data line during a fourth period after the third period of each image frame period.

* * * * *